(12) United States Patent
Shiraishi et al.

(10) Patent No.: US 6,625,239 B1
(45) Date of Patent: Sep. 23, 2003

(54) CIRCUIT FOR CAPTURING FRAME SYNC SIGNAL IN RECEIVER

(75) Inventors: Kenichi Shiraishi, Yokohama (JP); Akihiro Horii, Zama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/581,259

(22) PCT Filed: Dec. 11, 1998

(86) PCT No.: PCT/JP98/05615

§ 371 (c)(1),
(2), (4) Date: Jun. 27, 2000

(87) PCT Pub. No.: WO99/34568

PCT Pub. Date: Jul. 8, 1999

(30) Foreign Application Priority Data

Dec. 29, 1997 (JP) .............................................. 9-368190

(51) Int. Cl.[7] .......................... H04L 7/00; H04L 27/06; H04L 27/22; H04J 11/00; H04D 1/00
(52) U.S. Cl. ........................ 375/354; 375/355; 375/368; 375/343; 370/206; 329/304
(58) Field of Search ................................. 375/354, 368, 375/355; 370/206

(56) References Cited

U.S. PATENT DOCUMENTS

| 5,363,375 | A | * | 11/1994 | Chuang et al. ............. 370/332 |
| 5,740,204 | A | * | 4/1998 | Nagashima ................. 375/341 |
| 5,809,009 | A | * | 9/1998 | Matsuoka et al. .......... 370/206 |
| 5,828,954 | A | * | 10/1998 | Wang ......................... 455/260 |
| 5,886,999 | A | * | 3/1999 | Kojima et al. .............. 714/708 |
| 5,905,767 | A | * | 5/1999 | Fujimura .................... 375/355 |
| 6,023,491 | A | * | 2/2000 | Saka et al. .................. 375/326 |
| 6,081,549 | A | * | 6/2000 | Shou et al. ................. 375/152 |
| 6,246,281 | B1 | * | 6/2001 | Horii et al. ................. 329/304 |
| 6,393,077 | B1 | * | 5/2002 | Usui ........................... 375/343 |
| 6,526,107 | B1 | * | 2/2003 | Katoh et al. ................ 375/368 |

FOREIGN PATENT DOCUMENTS

| JP | 3-8175 | 1/1991 |
| JP | 7-135497 | 5/1995 |
| JP | 8-335936 | 12/1996 |
| JP | 9-186730 | 7/1997 |
| JP | 11-27335 | 1/1999 |

* cited by examiner

Primary Examiner—Mohammad H. Ghayour
Assistant Examiner—Tony Al-Beshrawi
(74) Attorney, Agent, or Firm—Eric J. Robinson; Robinson Intellectual Property Law Office, P.C.

(57) ABSTRACT

I and Q symbol streams are demodulated from a received signal of a wave to be PSK-modulated in which BPSK-modulated frame-synchronizing signal and superframe-identifying signal respectively having a 20-symbol length and an 8 PSK-modulated digital signal are time-multiplexed by a demodulating circuit (1). BPSK-demapped bit streams B0 to B3 are generated by a BSPK demapper (3) in accordance with criterion border lines obtained by rotating a basic BPSK criterion border line and a basic criterion border line whose received-signal points are the same as Q-axis on, I-Q phase plane by $\pi/4$, $2\pi/4$, and $3\pi/4$ counter-clockwise. When a pattern having is a difference of several bits at most from a frame-synchronizing signal is captured from B0 to B3 by first comparing circuits 60 to 63 and thereafter, a pattern having a difference of several bits at most from a superframe-identifying signal is captured by second comparing circuits 64 to 67 after a predetermined certain time, a frame-synchronizing-signal-capturing-signal generating circuit (90) outputs a frame-synchronizing-signal capturing signal (SYN).

3 Claims, 14 Drawing Sheets

FIG. 3

| INPUT (X0X1X2X3) | NDP |
|---|---|
| (0 0 0 0) | 0 |
| (0 0 0 1) | 1 |
| (0 0 1 0) | 1 |
| (0 0 1 1) | 2 |
| (0 1 0 0) | 1 |
| (0 1 0 1) | 2 |
| (0 1 1 0) | 2 |
| (0 1 1 1) | 3 |
| (1 0 0 0) | 1 |
| (1 0 0 1) | 2 |
| (1 0 1 0) | 2 |
| (1 0 1 1) | 3 |
| (1 1 0 0) | 2 |
| (1 1 0 1) | 3 |
| (1 1 1 0) | 3 |
| (1 1 1 1) | 4 |

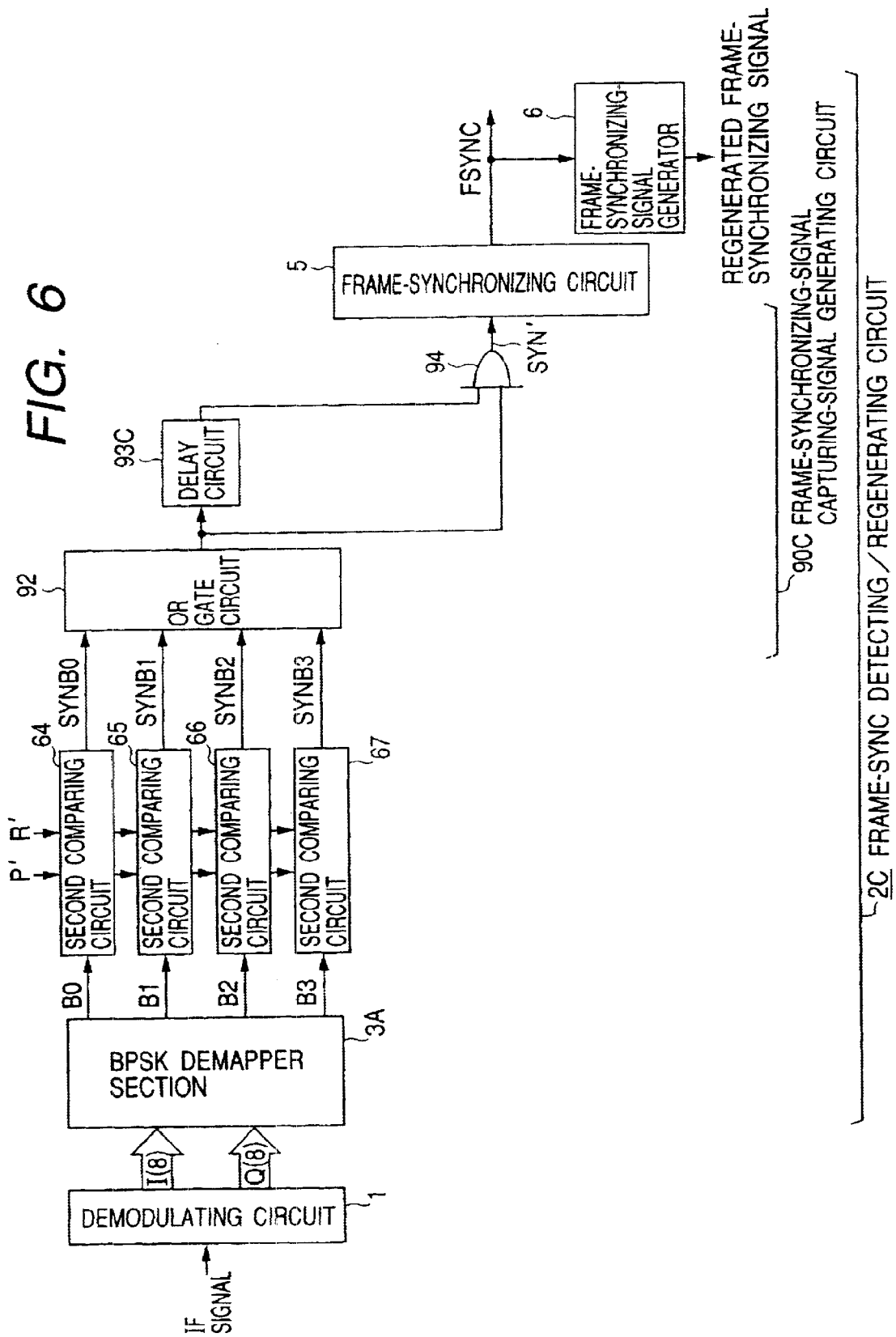

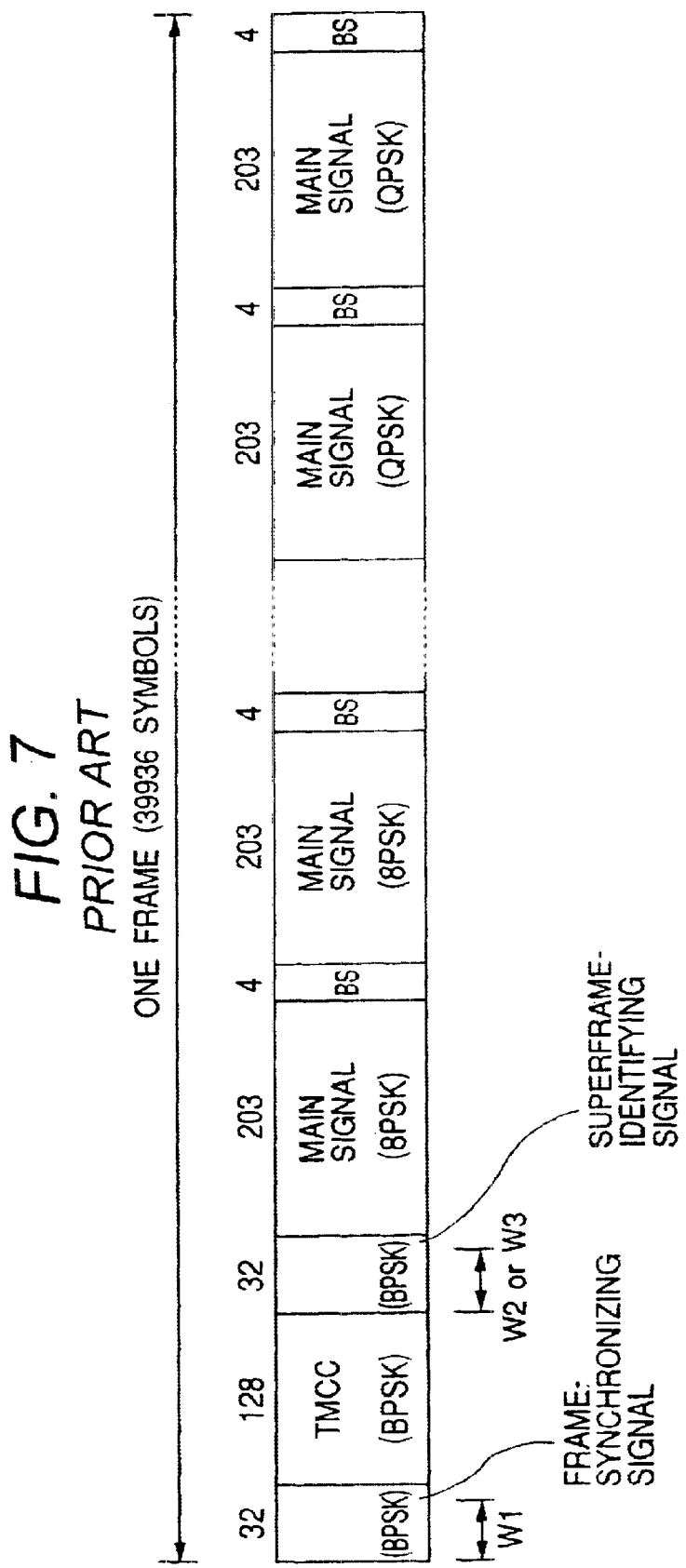

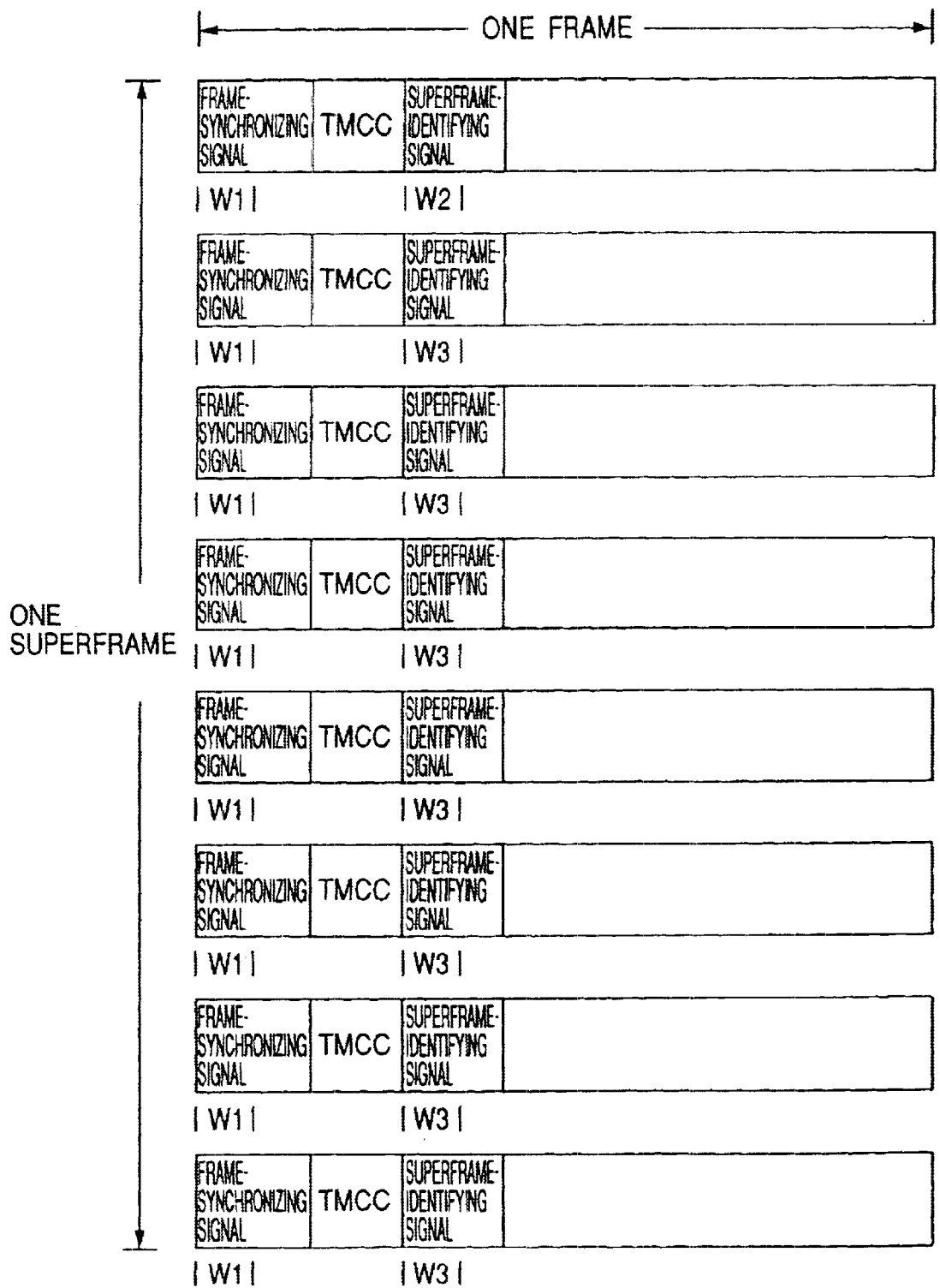

CIRCUIT FOR CAPTURING FRAME SYNC SIGNAL IN RECEIVER

TECHNICAL FIELD

The present invention relates to a frame-synchronizing-signal capturing circuit of a receiver, particularly to a frame-synchronizing-signal capturing circuit of a receiver for capturing a frame-synchronizing-signal portion in two series of I and Q symbol-stream data obtained by receiving and demodulating a signal to be PSK-modulated in which a BPSK-modulated frame-synchronizing signal or a BPSK-modulated frame-synchronizing signal and a superframe-identifying signal, an 8PSK-modulated digital signal, a QPSK-modulated digital signal, and a BPSK-modulated digital signal are time-multiplexed in accordance with a hierarchical transmission system or the like.

BACKGROUND ART

Practical use of digital satellite TV broadcast is advanced which conforms to a plurality of modulation systems having required C/Ns different from each other such as hierarchical transmission systems in which a wave to be 8PSK-modulated, a wave to be QPSK-modulated, and a wave to be BPSK-modulated are time-multiplexed and repeatedly transmitted every frame.

FIG. 7 is an illustration showing a frame configuration of a hierarchical transmission system. One frame is constituted of a frame-synchronizing-signal interval comprising 32 BPSK-modulated symbols, a TMCC (Transmission and Multiplexing Configuration Control) signal interval comprising 128 BPSK-modulated symbols to identify a transmission multiple configuration, a superframe-identifying signal interval comprising 32 symbols, a main signal interval of 203 8PSK(trellis-coding-8PSK)-modulated symbols, a burst symbol signal (BS) interval of four symbols in which a pseudo random noise (PN) signal is BPSK-modulated, a main signal interval of 203 8PSK(trellis-codec-8PSK)-modulated symbols, a burst symbol signal (BS) interval of four symbols in which a pseudo random noise (PN) signal is BPSK-modulated, a main signal interval of 203 QPSK-modulated symbols, a burst symbol signal (BS) interval of four symbols in which a pseudo random noise (PN) signal is BPSK-modulated, a main signal interval of 203 QPSK-modulated symbols, and a burst symbol signal (BS) interval of four BPSK-modulated symbols in order.

FIG. 8 is an illustration showing a superframe configuration according to the hierarchical transmission system. One superframe is constituted of 8 consecutive frames and a superframe-identifying signal serves as information for identifying a superframe. The 192 symbols from the head of a frame-synchronizing-signal interval up to the end of a superframe-identifying-signal interval are also referred to as a header.

The first-half 20 symbols of a frame-synchronizing-signal interval of 32 symbols are actually used as a frame-synchronizing signal. This is because the first-half 20 symbols in a 32-symbol interval to be originally used for another purpose serve as a unique word and the unique word is used as a frame-synchronizing signal. A frame-synchronizing signal comprising the 20 symbols is also referred to as "W1" which is shown by the following expression.

$$W1 = (S0S1 \ldots S18S19)$$
$$= (11101100110100101000)$$

(This is transmitted from the S0 side.)

Similarly, the first-half 20 symbols of a superframe-identifying signal of 32 symbols are actually used as a superframe-identifying signal. This is also because the first-half 20 symbols of a 32-symbol interval to be originally used for another purpose serve as a unique word and the unique word is used as a superframe-identifying signal. The first frame of a superframe in the superframe-identifying signal comprising 20 symbols is also referred to as "W2" which is shown by the following expression.

$$W2 = (U0U1 \ldots U18U19)$$
$$= (00001011011001110111)$$

(This is transmitted from the U0 side.)

Frames other than the first frame of a superframe in a superframe-identifying signal are also referred to as "W3" which is obtained by inverting each bit of W2 and W3 is shown by the following expression.

$$W3 = (V0V1 \ldots V18V19)$$
$$= (11110100100110001000)$$

(This is transmitted from the V0 side.)

Then, mapping for each modulation system at the transmission side is described below by referring to FIGS. 9A to 9C. FIG. 9A shows signal point arrangements on I-Q phase plane (also referred to as I-Q vector plane or I-Q signal space diagram) when using 8PSK for a modulation system. The 8PSK modulation system transmits a three-bit digital signal (abc) by one symbol and combinations of bits constituting one symbol include such eight ways as (000), (001), (010), (011), (100), (101), (110), and (111). These three-bit digital signals are converted into signal point arrangements "0" to "7" on the transmission-side I-Q phase plane in FIG. 9A and this conversion is referred to as 8PSK mapping.

In case of the example shown in FIG. 9A, a bit string (000) is converted into a signal point arrangement "0", a bit string (001) into a signal point arrangement "1", a bit string (011) into a signal point arrangement "2," a bit string (010) into a signal point arrangement "3", a bit string (100) into a signal point arrangement "4", a bit string (101) into a signal point arrangement "5", a bit string (111) into a signal point arrangement "6", and a bit string (1 10) into a signal point arrangement "7".

FIG. 9B shows signal point arrangements at I-Q phase plane when using QPSK for a modulation system. The QPSK modulation system transmits a two-bit digital signal (de) by one symbol and combinations of bits constituting the symbol include such four ways as (00), (01), (10), and (11). In case of the example in FIG. 9B, a bit string (00) is converted into a signal point arrangement "1," a bit string (01) into a signal point arrangement "3", a bit string (11) into a signal point arrangement "5", and a bit string (10) into a signal point arrangement "7".

FIG. 9C shows signal point arrangements at the time of using BPSK for a modulation system. The BPSK modulation system transmits a one-bit digital signal (f) by one symbol. In case of the digital signal (f), bit (0) is converted into a signal point arrangement "0" and bit (1) is converted into a signal point arrangement "4". Relations between signal point arrangements and arrangement numbers of various modulation systems are made same on the basis of 8BPSK.

I-axis and Q-axis of each of QPSK and BPSK of the hierarchical transmission system coincide with I-axis and Q-axis of 8PSK.

In case of a receiver for receiving a digital wave to be modulated (wave to be PSK-modulated) according to the hierarchical transmission system, as shown in FIG. 10, an intermediate-frequency signal IF of a signal received by a not-illustrated receiving circuit is demodulated by a demodulating circuit 1 and thus, I and Q base-band signals (hereafter also referred to as I and Q symbol-stream data) showing instantaneous values of I-axis and Q-axis orthogonal to each other for each symbol are obtained. When a frame-synchronizing signal is repeatedly captured every certain frame cycle from the demodulated I and Q base-band signals by a frame-sync detecting/regenerating circuit 2, it is judged that frame sync is established and thus, a frame-synchronizing pulse FSYNC is output or a regenerated frame-synchronizing signal is output.

Furthermore, after establishing the frame sync, the present rotation angle of the received signal can be obtained from the signal points arrangement of the frame-synchronizing part in the I, Q base-band signals captured by a frame sync detecting/regenerating circuit 2. And, any desired absolute phasing corresponding to the phase angle of a transmission signal can be established by reversely phase-rotating the I, Q base-band signals on the basis of the obtained rotation angle of the received signal.

Moreover, after frame sync is established, transmission-multiple-configuration identifying information (refer to TMCC in FIG. 7) is separated and it is identified in which modulation-system portion I and Q base-band signals are included. In accordance with the identification result, a main signal according to 8PSK modulation and a main signal according to QPSK modulation are separated from absolute-phase-generated I and Q base-band signals.

The demodulating circuit 1 orthogonally detects an intermediate-frequency signal IF by using a regenerated carrier wave and transmits I and Q base-band signals (also referred to as I and Q symbol-stream data) I(8) and Q(8) (numeral in parentheses shows the number of quantization bits and hereafter also referred to as I and Q by omitting the number of quantization bits) of eight quantization bits (two's complement system) showing instantaneous values of I-axis and Q-axis for each symbol. The demodulating circuit 1 according to the hierarchical transmission system establishes frame sync and performs 8PSK demodulation before a modulation system is identified. After frame sync is established and a modulation system is identified, the circuit 1 performs demodulation suitable for each modulation system in accordance with the modulation system of a received signal.

In the case of the demodulating circuit 1, reception-side I- and Q-axes rotate by $(\pi/4) \times n$ (n is one of integers 0 to 7) against transmission-side I- and Q-axes depending on a phase state of a regenerated carrier wave for a received carrier wave and a phase of a received-signal point on I-Q phase plane according to I and Q base-band signals I(8) and Q(8) at the reception side rotates when receiving digital signals related to signal point arrangements "0" to "7" on I-Q phase plane at the transmission side. For example, bits (0) and (1) mapped to signal point arrangements "0" and "4" at the transmission side through BPSK mapping appear on signal point arrangements "0" and "4" same as the transmission side when a received-signal-phase rotation angle θ at the reception side is equal to 0.

However, transmission-side bits (0) and (1) appear on signal point arrangements "1" and "5" when a phase rotates by θ=π/4 at the reception side, appear on signal point arrangements "2" and "6" when a phase rotates by θ=2π/4 at the reception side, appear on signal point arrangements "3" and "7" when a phase rotates by θ=3π/4 at the reception side, appear on signal point arrangements "4" and "0" when a phase rotates by θ=4π/4 at the reception side, appear on signal point arrangements "5" and "1" when a phase rotates by θ=5π/4 at the reception side, appear on signal point arrangements "6" and "2" when a phase rotates by θ=6π/4 at the reception side, and appear on signal point arrangements "7" and "3" when a phase rotates by θ=7π/4 at the reception side. The frame-sync detecting/regenerating circuit 2 must correctly capture a frame-synchronizing signal even if a regenerated carrier wave of the demodulating circuit 1 has any phase state.

As shown in FIG. 10, the frame-sync detecting/regenerating circuit 2 is constituted of a BPSK demapper section 3, sync detecting circuits 40 to 47, an OR gate circuit 53, a frame-synchronizing circuit 5, and a frame-synchronizing-signal generator 6.

I and Q base-band signals I(8) and Q(8) output from the demodulating circuit 1 are input to the BPSK demapper section 3 of the frame-sync detecting/regenerating circuit 2 in order to capture a frame-synchronizing signal and bit streams B0 to B7 BPSK-demapped are output for each of eight received-signal-phase-rotation angles θ. The BPSK demapper section 3 is constituted of, for example, a ROM.

In the hierarchical transmission system, a frame-synchronizing signal is transmitted together with a superframe-identifying signal by being BPSK-modulated so as to minimize a required C/N. In the case of a bit stream of a frame-synchronizing signal constituted of 20 bits, W1 is equal to (S0S1 . . . S18S19)=(11101100110100101000) which are transmitted from S0 in order. The bit stream is converted to a signal point arrangement "0" or "4" through the BPSK mapping shown in FIG. 9C at the transmission side and a converted symbol stream is transmitted.

When a received-signal-phase rotation angle θ is equal to 0, bit (0) of a frame-synchronizing signal appears on a signal point arrangement "0" and bit (1) of the signal appears on a signal point arrangement "4" at the reception side. To capture 20 bits, that is, a frame-synchronizing signal of 20 symbols BPSK-modulated and transmitted, it is necessary to convert received symbols into bit data through the BPSK demapping shown in FIG. 12A inversely to mapping converted at the transmission side. In FIG. 12A, (0) is judged when a received-signal point shown by I and Q base-band signals I and Q is kept in the right side of Q-axis (positive side of I-axis; refer to the hatched portion) on reception-side I-Q phase plane and (1) is judged when the received-signal point is kept in the left side of Q-axis (negative side of I-axis; refer to the unhatched portion). That is, in FIG. 12A, an output is judged as (0) or (1) depending on either of two judgement areas divided by a BPSK criterion border line (coinciding with Q-axis) shown by a bold line and thereby, it is judged that BPSK demapping is performed.

I and Q base-band signals I(8) and Q(8) are input to a BPSK demapper 30 of the BPSK demapper section 3 shown in FIG. 11 and the bit stream B0 BPSK-demapped in FIG. 12A is output from the BPSK demapper 30. In this specification, a demapper denotes a circuit for performing demapping. The bit stream B0 is input to the sync detecting circuit 40 and a bit stream of a frame-synchronizing signal is captured from the bit stream B0 in the sync detecting circuit 40.

Then, the sync detecting circuit 40 is described below by referring to FIG. 14. The sync detecting circuit 40 has 20 D-flip-flops (hereafter referred to as D-F/Fs) D19 to D0 connected in series and a 20-stage shift register is constituted of these D-F/Fs D19 to D0. The bit stream B0 is input to the D-F/F D19 and successively shifted up until the D-F/F D0. At the same time, logical inversion is applied to predetermined bits of the D-F/Fs D19 to D0 and then, outputs of the D-F/Fs D19 to D0 are input to an AND gate 51. An output SYNA0 of the AND gate 51 becomes a high potential when output states (D0D1 ... D18D19) of the D-F/Fs D19 to D0 become (11101100110100101000). That is, when W1 is captured, SYNA0 becomes a high potential.

The output SYNA0 of the sync detecting circuit 40 is input to the frame-synchronizing circuit 5 through the OR gate circuit 53. In the frame-synchronizing circuit 5, it is judged that frame sync is established when it is confirmed that a frame-synchronizing-signal capturing signal SYNA output by the OR gate circuit 53 repeatedly becomes a high potential every certain frame cycle and a frame-synchronizing pulse FSYNC is output every frame cycle.

A received-signal-phase rotation angle θ may have an angle other than 0. In this case, it is impossible to capture a frame-synchronizing signal by a combination of the BPSK demapper 30 and the sync detecting circuit 40. As shown in FIG. 11, the BPSK demapper section 3 is provided with BPSK demappers 31 to 37 corresponding to received-signal-phase rotation angles θ=π/4, 2π/4, 3π/4, 4π/4, 5π/4, 6π/4, and 7π/4.

FIG. 12B shows BPSK demapping when a symbol stream of a demodulated frame-synchronizing signal is phase-rotated by θ=π/4 and bit (0) appears on a signal point arrangement "1" and bit (1) appears on a signal point arrangement "5". In FIG. 12B, a BPSK criterion border line shown by a bold line rotates by π/4 counterclockwise from the basic BPSK criterion border line of BPSK demapping shown by a bold line in FIG. 12A in the case of reception at the same phase as that of the transmission side. The BPSK demapper 31 performs BPSK demapping in accordance with FIG. 12B. In FIG. 12B, (0) is judged when a received-signal point shown by I and Q base-band signals I and Q is kept in the top right area of the BPSK criterion border line and (1) is judged when the received-signal point is kept in the left bottom area of the border line. A bit stream BPSK-demapped by the BPSK demapper 31 serves as an output B1 of the BPSK demapper section 3 in FIG. 10.

Similarly, the BPSK demappers 32 to 37 perform BPSK demapping at BPSK criterion border lines rotated by 2π/4, 3π/4, ..., and 7π/4 counterclockwise from the basic BPSK criterion border line shown by a bold line of the BPSK demapping in FIG. 12A (refer to FIGS. 12C and 12D and FIGS. 13A to 13D) to stably capture frame-synchronizing signals phase-rotated by θ=2π/4, 3π/4, ..., and 7π/4 against the transmission side. Bit streams BPSK-demapped by the BPSK demappers 32 to 37 serve as outputs B2 to B7 of the BPSK demapper section 3 in FIG. 10.

Configurations of the sync detecting circuits 41 to 47 are the same as the configuration of the sync detecting circuit 40. By using these sync detecting circuits 40 to 47, a frame-synchronizing signal is captured in accordance with a combination of any BPSK demapper and any sync detecting circuit independently of phase rotation of a base-band signal against the transmission side according to a phase state of a regenerated carrier wave in the demodulating circuit 1 and a high-potential signal SYNAn (n is one of integers 0 to 7) is transmitted from a sync detecting circuit of a system capturing a frame-synchronizing signal.

Signals SYNAn output from the sync detecting circuits 40 to 47 are input to the OR gate circuit 53 in which the logical sum is computed. When any signal SYNAn becomes a high potential, a high-potential frame-synchronizing-signal capturing signal SYNA showing that a frame-synchronizing signal is captured is output from the OR gate circuit 53. The frame-synchronizing circuit 5 judges that frame sync is established when it is confirmed that a high potential of SYNA is repeatedly input every certain frame interval and outputs a frame-synchronizing pulse FSYNC every frame cycle. Whenever receiving the frame-synchronizing pulse FSYNC from the frame-synchronizing circuit 5, the frame-synchronizing-signal generator 6 generates a bit stream (referred to as a regenerated frame-synchronizing signal) same as a bit pattern W1 of a frame-synchronizing signal captured by the BPSK demapper section 3 and the sync detecting circuits 40 to 47.

The process is described above in which a frame-synchronizing signal is captured from I and Q base-band signals I(8) and Q(8) output from the demodulating circuit 1 by the frame-sync detecting/regenerating circuit 2 shown in FIG. 10 and a frame-synchronizing pulse FSYNC is output after a certain time and a regenerated frame-synchronizing signal is output.

When frame sync is established, processings such as identification of a transmission multiple configuration, detection of a received-signal-phase rotation angle, and absolute phase generation for making a received-signal phase coincide with that of the transmission side are performed. For example, an operation for identifying each transmission configuration by a not-illustrated transmission-configuration identifying circuit is performed as described below. When a frame-synchronizing pulse FSYNC is output, the transmission-configuration identifying circuit captures a bit stream Bn of a system repeatedly becoming a high potential among SYNA0 to SYNA7, extracts the TMCC pattern in FIG. 9 by using a predetermined timing signal generated from the frame-synchronizing pulse FSYNC, decodes the TMCC pattern, and outputs a modulation-system identifying signal showing on which modulation system the present I and Q base-band signals I and Q depend to the demodulating circuit 1 and the like. The demodulating circuit 1 performs demodulation suitable for a modulation system of a received signal in accordance with an input modulation-system identifying signal.

However, under the worst receiving environment in which a received C/N becomes 0 dB, a transmission error rate of the BPSK modulation system becomes approx. $10^{-1}$. Therefore, an error occurs in approx. 2 bits of a frame-synchronizing signal comprising 20 symbols. In this case, a problem occurs in the above-described conventional frame-sync detecting/regenerating circuit 2 that none of the sync detecting circuits 40 to 47 can capture a frame-synchronizing signal, thus frame sync cannot be established, and no digital signal can be received. To solve the problem, if each of the sync detecting circuits 40 to 47 outputs a frame-synchronizing signal by allowing an error of approx. several bits, a true frame-synchronizing signal cannot be captured because many patterns similar to a symbol pattern of the frame-synchronizing signal appear in I and Q symbol streams.

It is an object of the present invention to provide a frame-synchronizing-signal capturing circuit of a receiver capable of stably capturing frame-synchronizing signals even under the worst receiving environment.

DISCLOSURE OF THE INVENTION

The frame-synchronizing-signal capturing circuit of a receiver according to claim 1 of the present invention for capturing a frame-synchronizing signal from I and Q symbol-stream data obtained by receiving and demodulating a signal to be PSK-modulated in which BPSK-modulated frame-synchronizing signal and superframe-identifying signal, an 8PSK-modulated digital signal, a QPSK-modulated digital signal, and a BPSK-modulated digital signal are time-multiplexed, comprises BPSK demapping means for independently BPSK-demapping I and Q symbol-stream data in accordance with four criterion border lines obtained by rotating a criterion border line for performing BPSK-demapping to bits (0) and (1) (or (1) and (0)) depending on the fact that a received-signal point according to I and Q symbol-stream data is present at right side or left side of Q-axis on I-Q phase plane by $(\pi/4) \times m$ (m denotes four integers selected out of integers 0 to 7 so that the four integers are not duplicated and a selected angle does not coincide with others even if it is rotated by $\pi$) and outputting bit streams of four systems; first comparing means provided for each system of outputs of the BPSK demapping means to compare a data pattern held by a shift register with a frame-synchronizing-signal pattern or an inverted-frame-synchronizing-signal pattern while inputting a bit stream to the shift register and perform correlation-detection output when there are matched numbers in bit unit equal to or more than a predetermined first specified value P and there are only matched numbers equal to or less than a predetermined second specified value R; second comparing means provided for each system output from the BPSK demapping means to compare a data pattern held by a shift register with a superframe-identifying-signal pattern or an inverted-superframe-identifying-signal pattern while inputting a bit stream to the shift register and perform correlation-detection output when there are matched numbers in bit unit equal to or more than a predetermined third specified value P' and there are only matched numbers in bit unit equal to or less than a predetermined fourth specified value R'; and frame-synchronizing-signal capturing-signal generating means for outputting a frame-synchronizing-signal capturing signal when a correlation-detection output supplied from one of the first comparing means and a correlation-detection output supplied from one of the second comparing means are generated in accordance with a predetermined temporal relation.

The BPSK demapping means independently BPSK-demaps I and Q symbol-stream data in accordance with four criterion border lines obtained by rotating a basic criterion border line for performing BPSK-demapping to bits (0) and (1) (or (1) and (0)) depending on the fact that a received-signal point according to I and Q symbol-stream data is present at right side (positive side of I-axis) or left side (negative side of I-axis) of Q-axis on I-Q phase plane by $(\pi/4) \times m$ (m denotes four integers selected out of integers 0 to 7 so that the four integers are not duplicated and a selected angle does not coincide with others even if it is rotated by $\pi$) and outputs bit streams of four systems. When assuming that rotation angles of four criterion border lines against the basic criterion border line are equal to $\Theta_1$ to $\Theta_4$, symbol streams received at received-signal-phase rotation angles $\theta = \Theta_1$ and $\Theta_1 + \pi$ are changed to bit streams through the demapping using a criterion border line of $\Theta_1$ (however, in the case of $\Theta_1 + \pi$, a bit stream is obtained in which bits (0) and (1) are inverted). A symbol stream is changed to a bit stream in the case when a received-signal-phase rotation angle $\theta$ is equal to 0, $\pi/4$, $2\pi/4$, $3\pi/4$, $4\pi/4$, $5\pi/4$, $6\pi/4$, or $7\pi/4$ in combination with the demapping using criterion border lines of $\Theta_2$ to $\Theta_4$.

The first comparing means for inputting a bit stream demapped at a criterion border line of $\Theta_i$ (i is one of integers 1 to 4) by assuming a bit length of a frame-synchronizing signal as FL performs correction detection output when a frame-synchronizing-signal pattern is an object to be compared, a received-signal-phase rotation angle $\theta$ is equal to $\Theta_i$, and a pattern having only a difference within (FL-P) bits from a frame-synchronizing signal appears in the bit stream and performs correlation-detection output by assuming that a pattern having only a difference within R bits from the frame-synchronizing signal unless inverted appears when a pattern matched with the frame-synchronizing signal only within R bits appears in a bit stream inverted against the transmission side and a received-signal-phase rotation angle $\theta$ is equal to $\Theta_i + \pi$ (moreover, when an inverted frame-synchronizing-signal pattern is an object to be compared, a received-signal-phase rotation angle $\theta$ is equal to $\Theta_i$, and a pattern matched with an inverted frame-synchronizing signal within only R bits appears in a bit stream, the first comparing means performs correlation-detection output by assuming that a pattern having only a difference within R bits from a frame-synchronizing signal appears and when a received-signal-phase rotation angle $\theta$ is equal to $\Theta_i$ and a pattern having only a difference within only (FL-P) bits from an inverted frame-synchronizing signal appears in a bit stream inverted against the transmission side, the first comparing means performs correlation-detection output by assuming that a pattern having only a difference within (FL-P) bits from the frame-synchronizing signal unless inverted appears).

Moreover, the second comparing means for inputting a bit stream demapped at a criterion border line of $\Theta_i$ (i is one of integers 1 to 4) by assuming a bit length of a superframe-identifying signal as SFL performs correction detection output when a superframe-identifying-signal pattern is an object to be compared, a received-signal-phase rotation angle $\theta$ is equal to $\Theta_i$, and a pattern having only a difference within (SFL-P') bits from a superframe-identifying signal appears in the bit stream and performs correlation-detection output by assuming that a pattern having only a difference within R' bits from the superframe-identifying signal unless inverted appears when a pattern matched with the frame-synchronizing signal only within R' bits appears in a bit stream inverted against the transmission side and a received-signal-phase rotation angle $\theta$ is equal to $\Theta_i + \pi$ (moreover, when an inverted superframe-identifying-signal pattern is an object to be compared, a received-signal-phase rotation angle $\theta$ is equal to $\Theta_i$, and a pattern matched with an inverted superframe-identifying signal within only R' bits appears in a bit stream, the second comparing means performs correlation-detection output by assuming that a pattern having only a difference within R' bits from a superframe-identifying signal unless inverted appears and moreover, when a received-signal-phase rotation angle $\theta$ is equal to $\Theta_i + \pi$ and a pattern having only a difference within only (SFL-P') bits from an inverted superframe-identifying signal appears in a bit stream inverted against the transmission side, the second comparing means performs correlation-detection output by assuming that a pattern having only a difference within (SFL-P') bits from the superframe-identifying signal unless inverted appears).

The frame-synchronizing-signal capturing-signal generating means outputs a frame-synchronizing-signal capturing signal when correlation-detection output from one of the first comparing means and correlation-detection output from one of the second comparing means are generated in accordance with a predetermined time relation.

In the case of the hierarchical transmission system, a frame-synchronizing signal and a superframe-identifying signal are arranged in one frame in accordance with a predetermined positional relation. When a pattern having a difference of only one bit to several bits from a pattern of a frame-synchronizing signal and a pattern having a difference of only one bit to several bits from the pattern of the frame-synchronizing signal appear in demodulated I and Q symbol-stream data in accordance with a predetermined time relation specified by a frame format, the pattern having a difference of only one bit to several bits from the pattern of the frame-synchronizing signal has a very high possibility that the pattern is a frame-synchronizing signal. Therefore, when correlation-detection output from one of the first comparing means and correlation-detection output from one of the second comparing means are generated in accordance with a predetermined time relation, it is possible to stably capture frame-synchronizing signals by outputting a frame-synchronizing-signal capturing signal and therefore, reception is not made impossible.

The frame-synchronizing-signal capturing circuit of a receiver according to claim 2 of the present invention comprises BPSK demapping means for independently BPSK-demapping I and Q symbol-stream data in accordance with four criterion border lines obtained by rotating a criterion border line for performing BPSK-demapping to bits (0) and (1) (or (1) and (0)) depending on the fact that a received-signal point according to I and Q symbol-stream data is present at right side or left side of Q-axis on I-Q phase plane by $(\pi/4) \times m$ (m denotes four integers selected out of integers 0 to 7 so that the four integers are not duplicated and a selected angle does not coincide with others even if it is rotated by $\pi$) and outputting bit streams of four systems; comparing means provided for each system of outputs of the BPSK demapping means to compare a data pattern held by a shift register with a frame-synchronizing-signal pattern or an inverted-frame-synchronizing-signal pattern while inputting a bit stream to the shift register and perform correlation-detection output when there are matched numbers in bit unit equal to or more than a predetermined first specified value P and there are only matched numbers equal to or less than a predetermined second specified value R; and frame-synchronizing-signal-capturing-signal generating means for outputting a frame-synchronizing-signal capturing signal when correlation-detection output is generated from one of comparing means and thereafter, correlation-detection output is generated again from one of the comparing means again at a timing when elapsing by a predetermined time.

In the case of the hierarchical transmission system, a frame-synchronizing signal is set to a predetermined position in one frame. When a pattern having a difference of only one bit to several bits from a pattern of the frame-synchronizing signal appears in demodulated I and Q symbol-stream data every frame cycle, the pattern having a difference of only one bit to several bits from the pattern of the frame-synchronizing signal has a very high possibility that it is a frame-synchronizing signal. Therefore, when correlation-detection output is generated from one of comparing means and thereafter, correction detection output is generated again from one of the comparing means at a timing when elapsing by a predetermined time such as one frame cycle or two frame cycles, it is possible to stably capture frame-synchronizing signals by outputting a frame-synchronizing-signal capturing signal and therefore, reception is not made impossible.

The frame-synchronizing-signal capturing circuit of a receiver according to claim 3 of the present invention comprises BPSK demapping means for independently BPSK-demapping I and Q symbol-stream data to output bit streams of four systems in accordance with four criterion border lines obtained by rotating a criterion border line for performing BPSK-demapping to bits (0) and (1) (or (1) and (0)) depending on the fact that a received-signal point according to I and Q symbol-stream data is present at right side or left side of Q-axis on I-Q phase plane by $(\pi/4) \times m$ (m denotes four integers selected out of integers 0 to 7 so that the four integers are not duplicated and a selected angle does not coincide with others even if it is rotated by $\pi$); comparing means provided for each system of outputs of the BPSK demapping means to compare a data pattern held by a shift register with a superframe-identifying-signal pattern or an inverted-superframe-identifying-signal pattern while inputting a bit stream to the shift register and perform correlation-detection output when there are matched numbers in bit unit equal to or more than a predetermined specified value P' and there are only matched numbers equal to or less than a predetermined specified value R'; and frame-synchronizing-signal-capturing-signal generating means for outputting a temporary frame-synchronizing-signal capturing signal when a correlation-detection output is generated from one of the comparing means and thereafter, a correlation-detection output is generated again from one of the comparing means at a timing when elapsing by a predetermined time.

In the case of the hierarchical transmission system, a frame-synchronizing signal and a superframe-identifying signal are set to predetermined positions in one frame. When a pattern having a difference of only one bit to several bits from a pattern of the superframe-identifying signal appears in demodulated I and Q symbol-stream data every frame cycle, the pattern having a difference of only one bit to several bits from the pattern of the superframe-identifying signal has a very high possibility that it is a superframe-synchronizing signal and a posisibility that a frame-synchronizing signal appears in accordance with a certain time relation is very high. Therefore, when correlation-detection output is generated from one of the comparing means and thereafter, correlation-detection output is generated again from one of the comparing means at a timing when elapsing by a predetermined time such as one frame cycle, two frame cycles, or one superframe cycle, it is possible to stably capture frame-synchronizing signals by outputting a temporary frame-synchronizing-signal capturing signal and therefore, reception is not disabled.

BRIEF DESCRIPTION OF THE DRAWINGS

FIG. 3 is an illustration showing outputs and inputs of a matched-number measuring circuit in FIG. 2;

FIG. 6 is a block diagram showing an essential portion of the wave-to-be-PSK-modulated receiver of another modification of the embodiment in FIG. 1;

FIG. 7 is a prior art illustration showing a frame configuration of a hierarchical transmission system;

FIG. 8 is a prior art illustration showing a superframe configuration of a hierarchical transmission system;

BEST MODE FOR CARRYING OUT THE INVENTION

Then, an embodiment of the present invention is described below by referring to FIG. 1.

Figure 1:
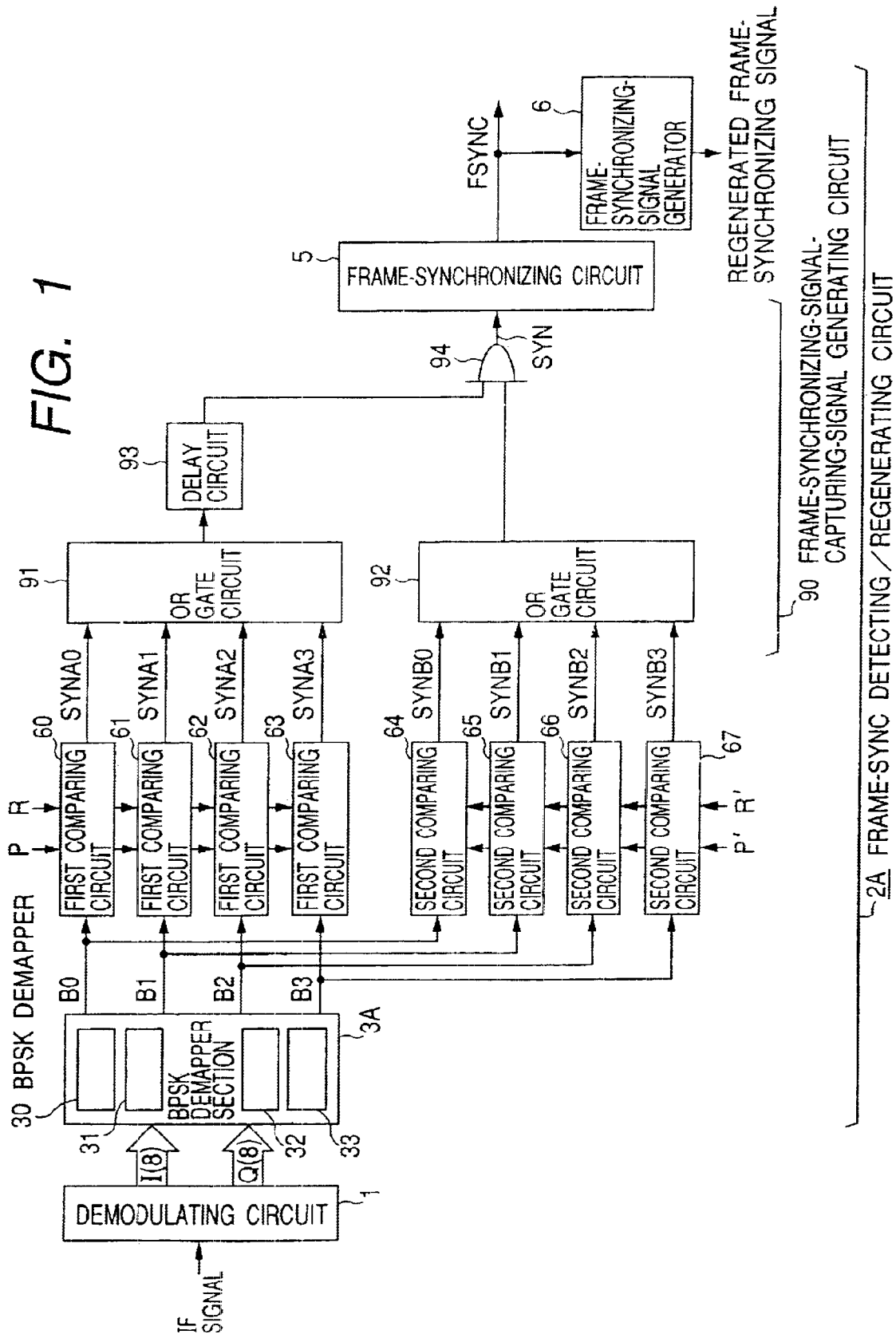
FIG. 1 is a block diagram of a configuration of an essential portion of the wave-to-be-PSK-modulated receiver of an embodiment of the present invention.
Figure 10:
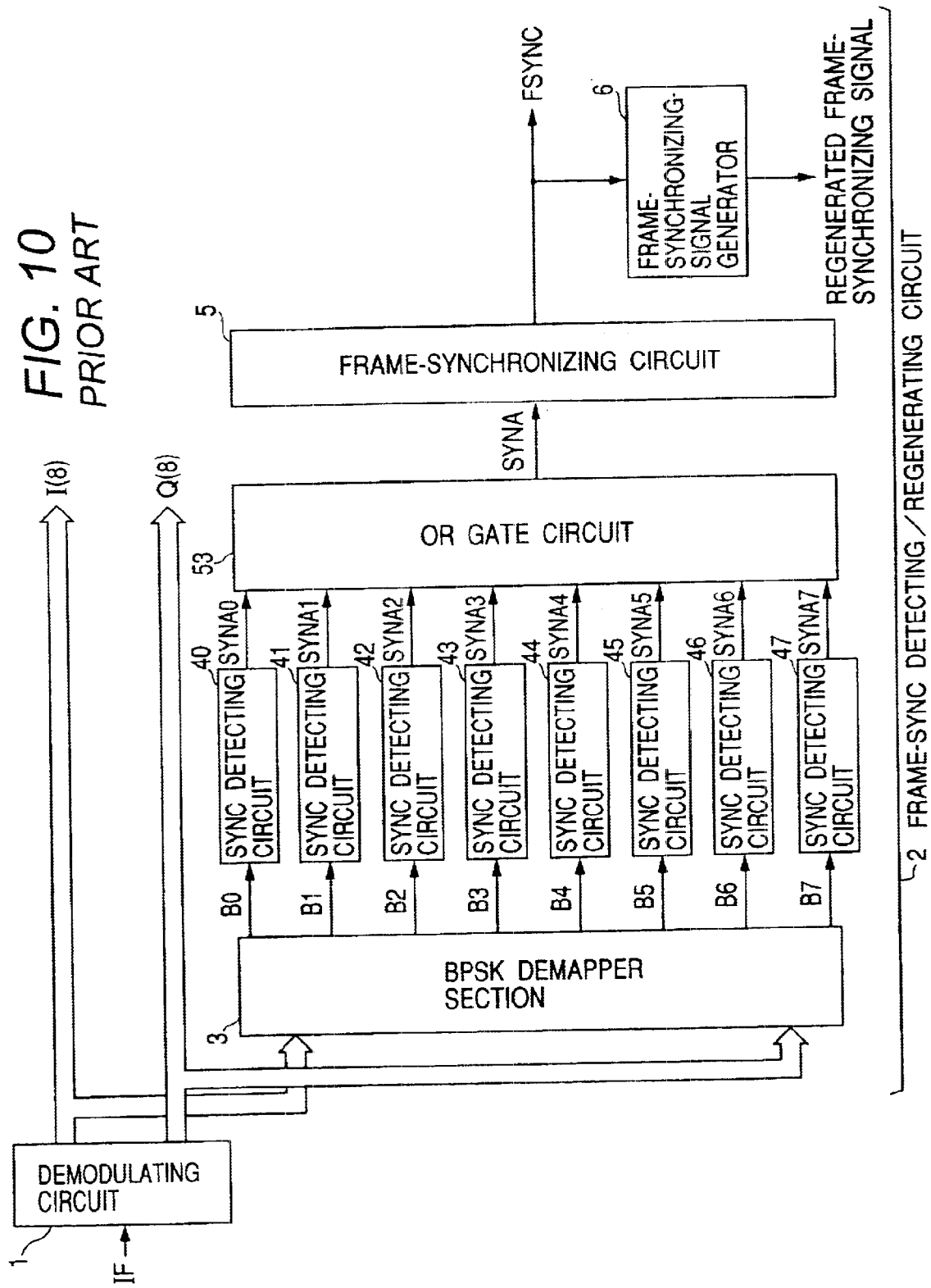
FIG. 10 is a block diagram showing a configuration around a demodulating circuit of a wave-to-be-PSK-modulated receiver according to a conventional hierarchical transmission system.
Figure 11:
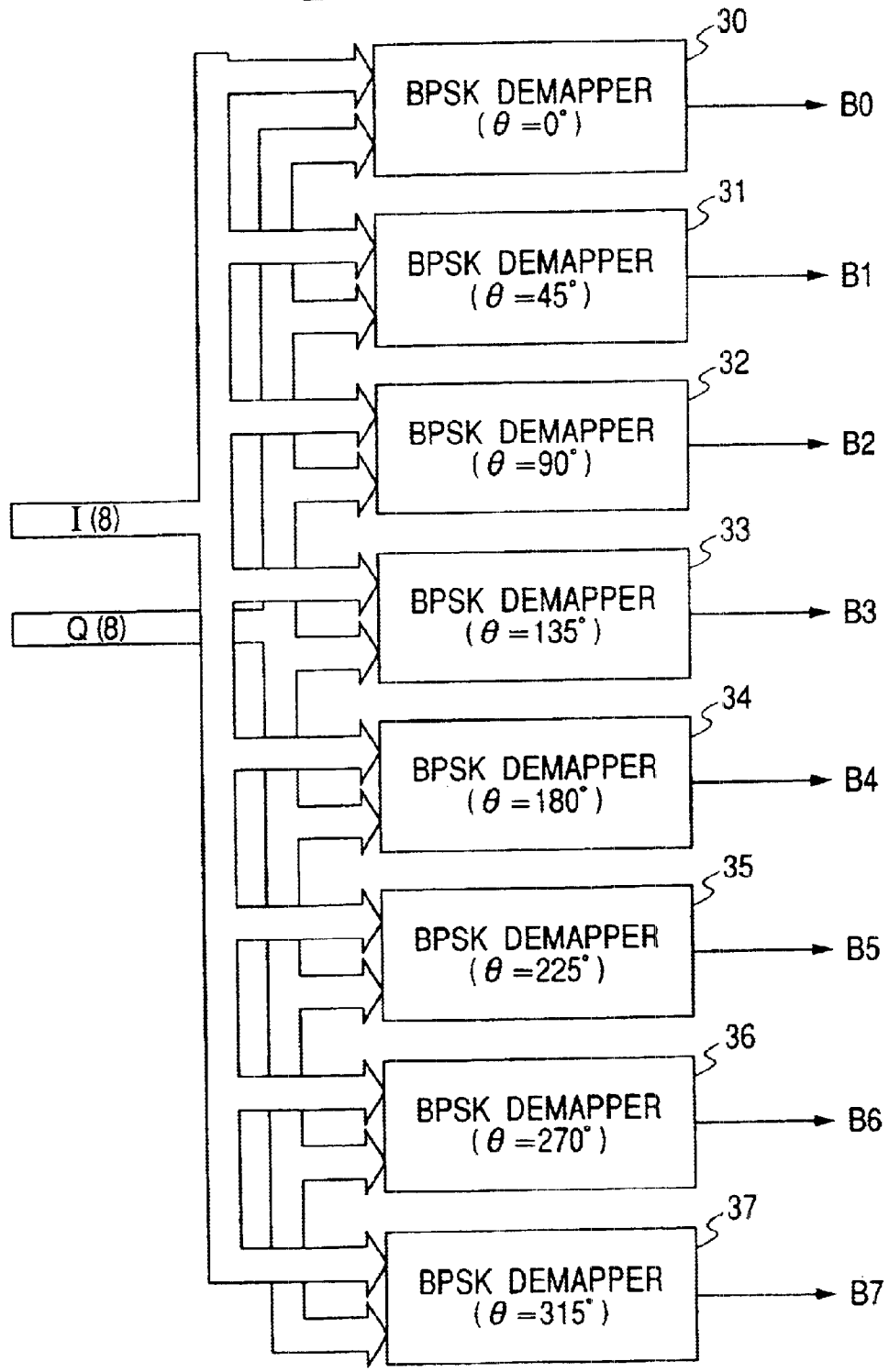
FIG. 11 is a prior art block diagram showing a configuration of a BPSK demapper section in FIG. 10.

FIG. 1 is a block diagram of an essential portion of a wave-to-be-PSK-modulated receiver of the present invention, in which a component same as those in FIGS. 10 and 11 is provided with the same symbol.

I and Q base-band signals I(8) and Q(8) output from a demodulating circuit 1 are input to a BPSK demapper section 3A of a frame-sync detecting/regenerating circuit 2A in order to capture a frame synchronizing signal and bit streams B0 to B3 are output which are BPSK-demapped for each of four sets obtained by combining every two received-signal-phase rotation angles out of eight received-signal-phase rotation angles θ such as 0, π/4, 2π/4, 3π/4, 4π/4, 5π/4, 6π/4, and 7π/4 so that every two received-signal-phase rotation angles are different from each other by π. The BPSK demapper section 3A is constituted of, for example, a ROM.

The BPSK demapper section 3A has four BPSK demappers 30 to 33 (for the BPSK demappers 30 to 33, refer to FIG. 11). Each of the BPSK demappers 30 to 33 independently BPSK-demaps I and Q symbol-stream data I(8) and Q(8) to output bit streams B0 to B3 of four systems in accordance with four BPSK criterion border lines obtained by rotating a basic BPSK criterion border line (refer to the bold line in FIG. 12A) for performing BPSK-demapping to bits (0) and (1) (or (1) and (0)) depending on the fact that a received-signal point according to I and Q symbol-stream data I(8) and Q(8) is present at right side (positive side of I-axis) or left side (negative side of I-axis) of Q-axis on I-Q phase plane by (Θ=π/4)×m (m denotes four integers selected out of integers 0 to 7 so that the four integers are not duplicated and a selected angle does not coincide with others even if it is rotated by π).

Figure 12A:
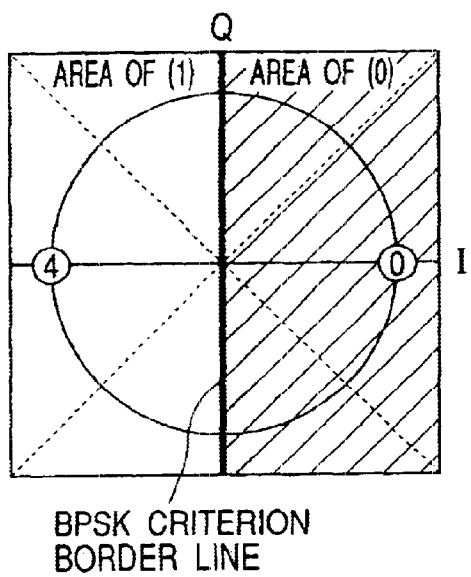
FIGS. 12A to 12D are prior art illustrations for explaining BPSK demapping.

Specifically, the BPSK demapper 30 is used to correctly BPSK-demap a received symbol stream when a received-signal-phase rotation angle θ is equal to 0 or π, which performs demapping to bit (0) or (1) depending on the fact that a received-signal point according to I and Q symbol-stream data I(8) and Q(8) is present at right side or left side of a basic BPSK criterion border line (coinciding with Q-axis) on I-Q phase plane in accordance with the basic BPSK criterion border line shown in FIG. 12A when m=0 (Θ$_1$=0) is selected. When the received-signal-phase rotation angle θ is equal to 0, a bit stream same as that of the transmission side is output. However, when θ is equal to π, a bit stream in which bits (0) and (1) are inverted is output to the transmission side.

Figure 12B:
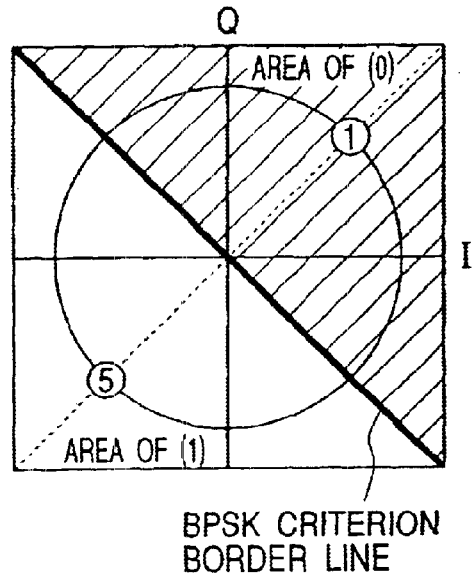

Moreover, the BPSK demapper 31 is used to correctly BPSK-demap a received symbol stream when a received-signal-phase rotation angle θ is equal to π/4 or 5π/4, which performs demapping to bit (0) or (1) depending on the fact that a received-signal point according to I and Q symbol-stream data I(8) and Q(8) is present at top right side or bottom left side of a BPSK criterion border line on I-Q phase plane in accordance with the BPSK criterion border line (refer to FIG. 12B) obtained by rotating the basic BPSK criterion border line shown in FIG. 12A counterclockwise by π/4 when m=1 (Θ$_2$=π/4) is selected. When the received-signal-phase rotation angle θ is equal to π/4, a bit stream same as that of the transmission side is output. However, when the θ is equal to 5π/4, a bit stream in which bits (0) and (1) are inverted is output to the transmission side.

Figure 12C:
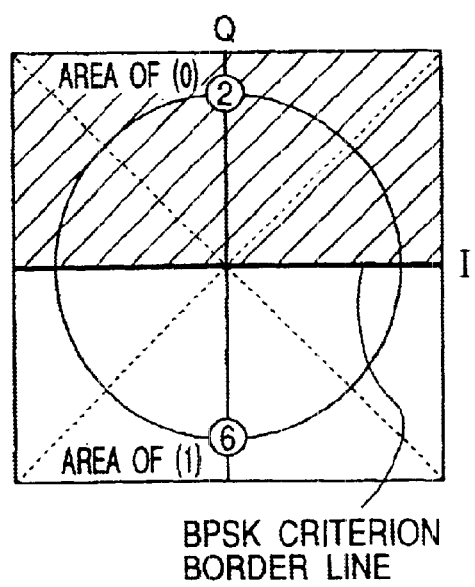

The BPSK demapper 32 is used to correctly BPSK-demap a received symbol stream when a received-signal-phase rotation angle θ is equal to 2π/4 or 6π/4, which performs demapping to bit (0) or (1) depending on the fact that a received-signal point according to I and Q symbol-stream data I(8) and Q(8) is present at upper side or lower side of a BPSK criterion border line on I-Q phase plane in accordance with a BPSK criterion border line obtained by rotating the basic BPSK criterion border line shown in FIG. 12A counterclockwise by 2π/4 (refer to FIG. 12C) when m=2 (Θ$_3$=2π/4) is selected. However, when the received-signal-phase rotation angle θ is equal to 2π/4, a bit stream same as that of the transmission side is output. However, when the θ is equal to 6π/4, a bit stream in which bits (0) and (1) are inverted is output to the transmission side.

Figure 12D:
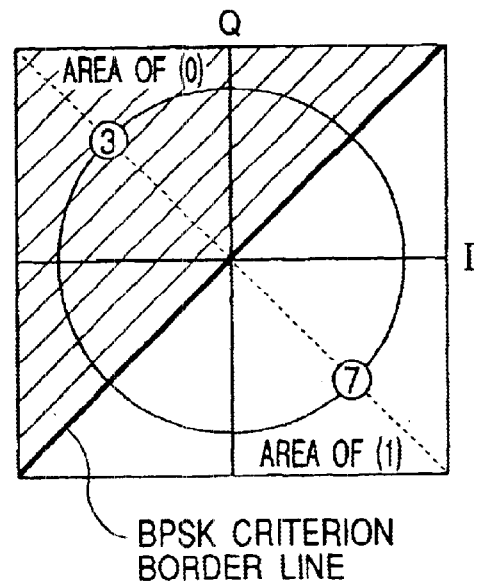
Figure 13A:
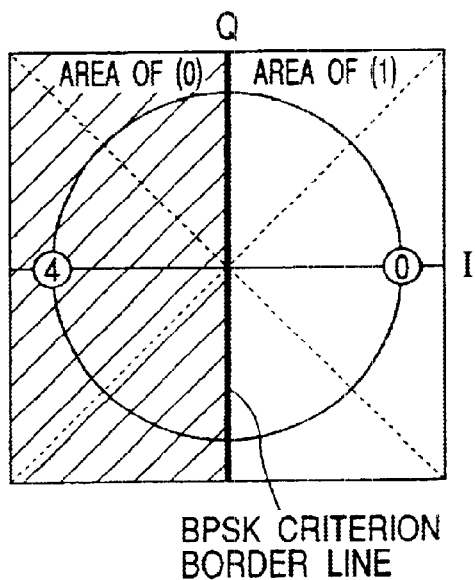
FIGS. 13A to 13D are prior art illustrations for explaining BPSK demapping.
Figure 13B:
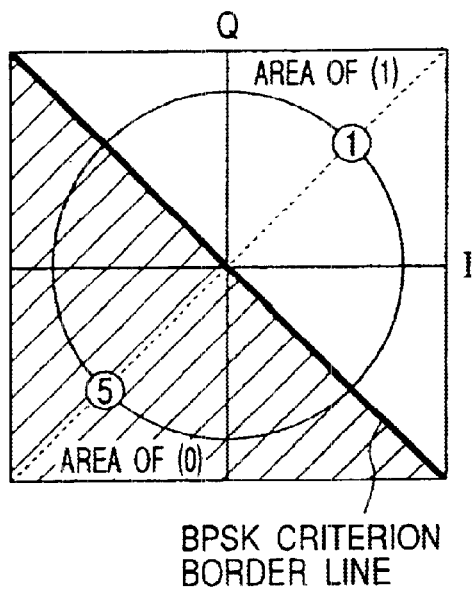
Figure 13C:
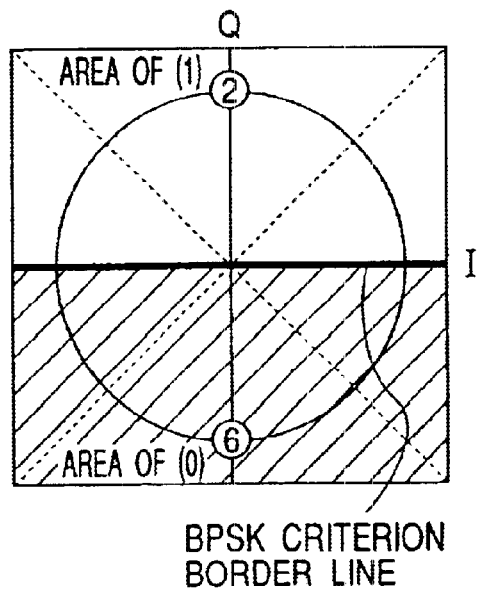
Figure 13D:
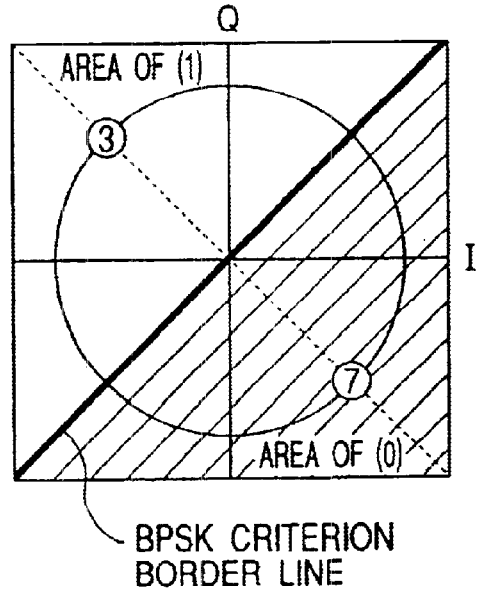
Figure 14:
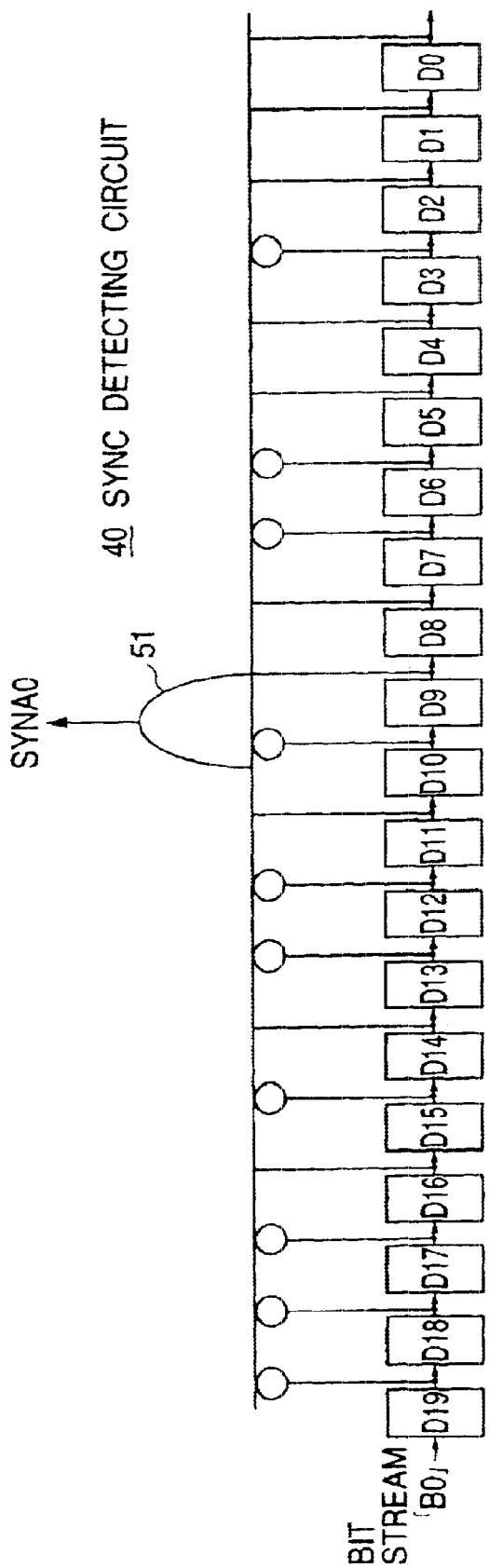
FIG. 14 is a prior art circuit diagram showing a configuration of a sync detecting circuit in FIG. 10.

The BPSK demapper 33 is used to correctly BPSK-demap a received symbol stream when a received-signal-phase rotation angle θ is equal to 3π/4 or 7π/4, which performs demapping to bit (0) or (1) depending on the fact that a received-signal point according to I and Q symbol-stream data I(8) and Q(8) is present at top left side or bottom right side of a BPSK criterion border line on I-Q phase plane in accordance with a BPSK criterion border line obtained by rotating the basic BPSK criterion border line shown in FIG. 12A counterclockwise by 3π/4 (refer to FIG. 12D) when m=3 (Θ$_4$=3π/4) is selected. When the received-signal-phase rotation angle θ is equal to 3π/4, a bit stream same as that of the transmission side is output. However, when the θ is equal to 7π/4, a bit stream in which bits (0) and (1) are inverted is output to the transmission side.

Figure 2:
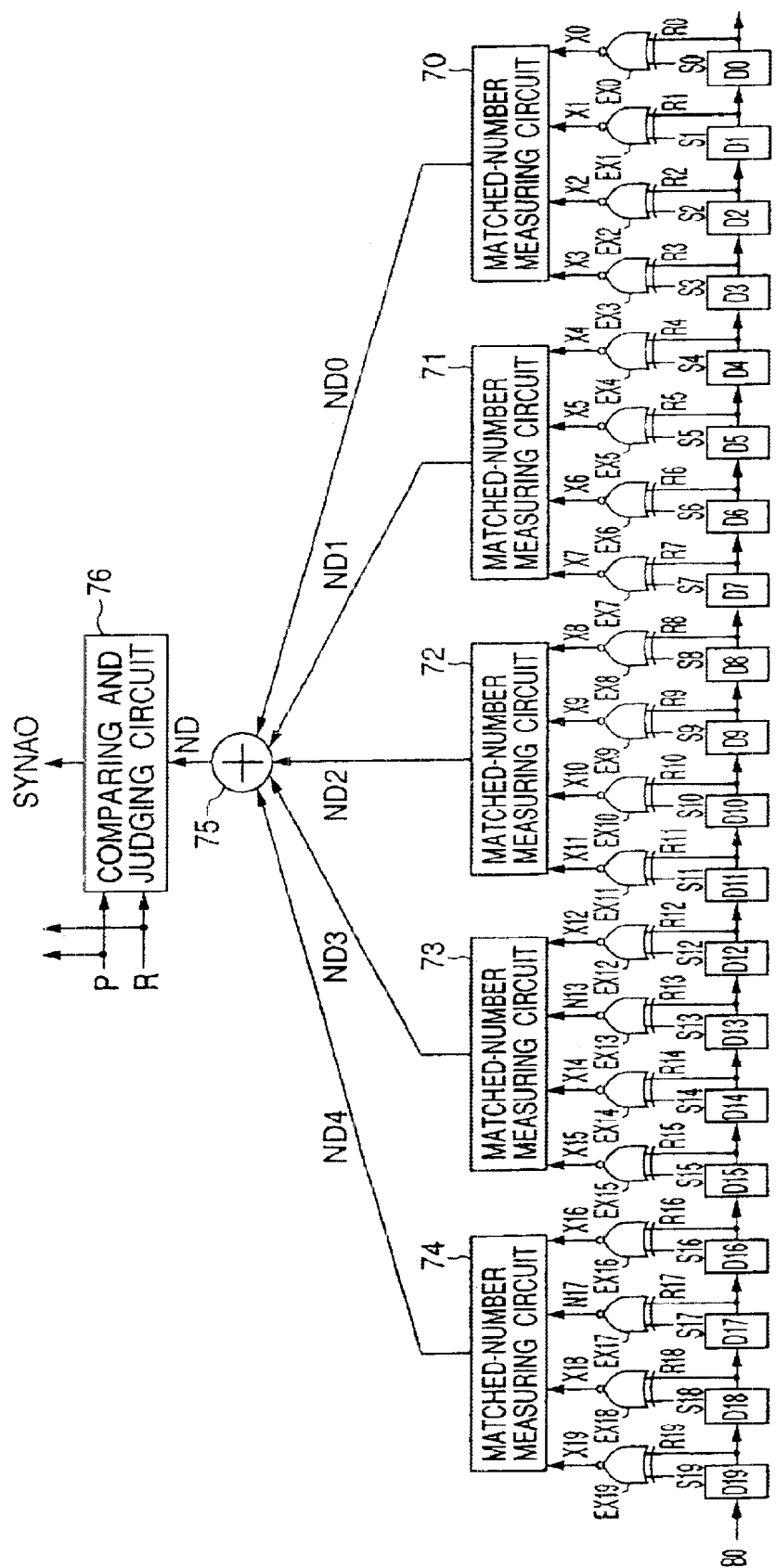
FIG. 2 is a block diagram showing a configuration of a first comparing circuit in FIG. 1.

First comparing circuits 60 to 63 and second comparing circuits 64 to 67 are provided for output sides of the BPSK demappers 30 to 33. The first comparing circuits 60 to 63 have the same configuration and the configuration of the first comparing circuit 60 is shown in FIG. 2. The first comparing circuit 60 has 20 D-flip-flops (hereafter referred to as D-F/Fs) D19 to D0 connected in series and a 20-stage shift register is constituted of these D-F/Fs D19 to D0. A bit stream B0 is input to the D-F/F D19 and successively shift up until the D-F/F D0. Data R19 to R0 held by (stored in) the D-F/Fs D19 to D0 are input to one input terminals of 20 EX-NOR circuits EX19 to EX0 individually set. Bit data S19 to S0 constituting a bit stream pattern W1 of a frame-synchronizing signal are input to the other input terminals of the EX-NOR circuits EX19 to EX0.

Outputs X0 to X19 of the EX-NOR circuits EX0 to EX19 are set to (1) when two inputs are matched and to (0) when two inputs are not matched. Five matched-number measuring circuits 70 to 74 are provided for output sides of the EX-NOR circuits EX0 to EX19, in which each of the circuits 70 to 74 is connected to every four of the circuits EX0 to EX19. The matched-number measuring circuits 70 to 74 measure the input number of (1)s and output measured matched-number data ND0 to ND4. For example, the matched-number measuring circuit 70 outputs ND0 according to the relation in FIG. 3 correspondingly to states of X0 to X3 input from the EX-NOR circuits EX0 to EX3. The same is true for other matched-number measuring circuits 71 to 74. It is possible to simply constitute these matched-number measuring circuits 70 to 74 in small size in accordance with table conversion by a ROM or a combinational logic circuit.

Outputs ND0 to ND4 of the matched-number measuring circuits 70 to 74 are added by an adder 75 and an added value is input to a comparing and judging circuit 76 as ND. The comparing and judging circuit 76 outputs a high-potential correlation-detecting signal SYNA0 when ND is equal to or larger than a predetermined first specified value P or ND is equal to or smaller than a predetermined second specified value R. In this case, it is assumed that P is set to 18 and R is set to 2.

Then, operations of the BPSK demapper 30 and first comparing circuit 60 are described below. When a received-signal-phase rotation angle θ is equal to 0 and the portion of a BPSK-modulated frame-synchronizing signal W1 is correctly received, a bit stream B0 which is the portion of the frame-synchronizing signal W1 and in which (0) or (1) is not inverted is output from the BPSK demapper 30. In this case, when a frame-synchronizing-signal portion is just held by the D-F/Fs D0 to D19 constituting a shift register of the first comparing circuit 60 and output states (R0R1 . . . R18R19) become (1110110011010010100), outputs ND0 to ND5 of the matched-number measuring circuits 70 to 74 become 4 and an output ND of the adder 75 becomes 20. In this case, the comparing and judging circuit 76 shows ND≧P and has a difference of (20-P) bits or less from a bit pattern W1. Therefore, the circuit 76 outputs a high-potential correlation-detecting signal SYNA0 (the high-potential correlation-detecting signal SYNA0 shows a possibility of capturing a frame-synchronizing signal).

When a received-signal-phase rotation angle θ is equal to 0 and a receiving environment is deteriorated, an error of 1 bit or 2 bits occurs in a bit stream B0 of a frame-synchronizing-signal portion transmitted from the BPSK demapper 30. In this case, when the Then, operations of the BPSK demapper 30 and first comparing circuit 60 are described below. When a received-signal-phase rotation angle θ is equal to 0 and the portion of a BPSK-modulated frame-synchronizing signal W1 is correctly received, a bit stream B0 which is the portion of the frame-synchronizing signal W1 and in which (0) or (1) is not inverted is output from the BPSK demapper 30. In this case, when a frame-synchronizing-signal portion is just held by the D-F/Fs D0 to D19 constituting a shift register of the first comparing circuit 60 and output states (R0R1 . . . R18R19) become (1110110011010010100), outputs ND0 to ND5 of the matched-number measuring circuits 70 to 74 become 4 and an output ND of the adder 75 becomes 20. In this case, the comparing and judging circuit 76 shows ND≧P and has a difference of (20-P) bits or less from a bit pattern W1. Therefore, the circuit 76 outputs a high-potential correlation-detecting signal SYNA0 (the high-potential correlation-detecting signal SYNA0 shows a possibility of capturing a frame-synchronizing signal).

When a received-signal-phase rotation angle θ is equal to 0 and a receiving environment is deteriorated, an error of 1 bit or 2 bits occurs in a bit stream B0 of a frame-synchronizing-signal portion transmitted from the BPSK demapper 30. In this case, when the frame-synchronizing-signal portion is just held by the D-F/Fs D0 to D19, an output ND of the adder 75 is equal to 18 or 19 and the comparing and judging circuit 76 shows ND≧P. Therefore, the circuit 76 outputs a high-potential correlation-detecting signal SYNA0 showing a possibility of capturing a frame-synchronizing signal. However, also when a pattern having only a difference of approx. 2 bits from a frame-synchronizing signal is present at a 20-bit portion of the bit stream B0 other than the frame-synchronizing signal, the comparing and judging circuit 76 outputs a high-potential correlation-detecting signal SYNA0. Therefore, it is not judged that a frame-synchronizing signal is captured even if only an expression ND≧P is effectuated.

When a received-signal-phase rotation angle θ is equal to 7i and a BPSK-modulated frame-synchronizing signal is correctly received, a bit stream B0 which is the portion of a frame-synchronizing signal (W1) and in which (0) and (1) are inverted is output from the BPSK demapper 30. In this case, when output states (R0R1 . . . R18R19) of the D-F/F D0 to D19 of the first comparing circuit 60 become (00010011001011010111) obtained by inverting a bit pattern of a frame-synchronizing signal, outputs ND0 to ND5 of the matched-number measuring circuits 70 to 74 become 0 and an output ND of the adder 75 becomes 0. In this case, the comparing and judging circuit 76 shows ND≦R that is matched with W1 in (20-R) bits or more unless inverted. Therefore, the circuit 76 outputs a high-potential correlation-detecting signal SYNA0 showing a possibility of capturing a frame-synchronizing signal.

When a received-signal-phase rotation angle θ is equal to x and a receiving environment is deteriorated, an error of 1 bit or 2 bits occurs in a bit stream B0 in which a frame-synchronizing-signal portion transmitted from the BPSK demapper 30 is inverted. In this case, when an inverted pattern of the frame-synchronizing-signal portion is just held by the D-F/F D0 to D19, an output ND of the adder 75 is equal to 1 to 2 and the comparing and judging circuit 76 shows ND≦R. Therefore, the circuit 76 outputs a high-potential correlation-detecting signal SYNA0 showing a possibility of capturing a frame-synchronizing signal. Moreover, when a pattern having a difference of only approx. 2 bits from an inverted frame-synchronizing signal is occasionally present at a 20-bit portion of a bit stream B0 other than the inverted frame-synchronizing signal, the comparing and judging circuit 76 also outputs a high-potential correlation-detecting signal SYNA0. Therefore, it is not judged that a frame-synchronizing signal is captured even if only an expression ND≦R is effectuated.

The first comparing circuits 61 to 63 are constituted completely the same as the first comparing circuit 60 is. When a received-signal-phase rotation angle θ is equal to π/4 and a BPSK-modulated frame-synchronizing signal is received, a non-inverted bit stream of a frame-synchronizing-signal portion is output from the BPSK demapper 31. When a received-signal-phase rotation angle θ is equal to 5π/4 and a BPSK-modulated frame-synchronizing signal is received, an inverted bit stream of a frame-synchronizing-signal portion is output from the BPSK demapper 31. Similarly to the case of the first comparing circuit 60, when a frame-synchronizing signal is correctly received or a receiving environment is deteriorated and an error of 1 bit or 2 bits is received, the first comparing circuit 61 outputs a high-potential correlation-detecting signal SYNA1 showing a possibility of capturing a frame-synchronizing signal.

When a received-signal-phase rotation angle θ is equal to 2π/4 and a BPSK-modulated frame-synchronizing signal is received, a non-inverted bit stream of a frame-synchronizing-signal portion is output from the BPSK demapper 32. When a received-signal-phase rotation angle θ is equal to 6π/4 and a BPSK-modulated frame-synchronizing signal is received, an inverted bit stream of a frame-synchronizing-signal portion is output from the BPSK demapper 32. When a frame-synchronizing signal is correctly received or a receiving environment is deteriorated and a frame-synchronizing signal is received with an error of 1 bit or 2 bits, the first comparing circuit 62 outputs a high-potential correlation-detecting signal SYNA2 showing a possibility of capturing a frame-synchronizing signal.

When a received-signal-phase rotation angle θ is equal to 3π/4 and a BPSK-modulated frame-synchronizing signal is received, a non-inverted bit stream of a frame-synchronizing-signal portion is output from the BPSK demapper 33. When a received-signal-phase rotation angle θ is equal to 7π/4 and a BPSK-modulated frame-synchronizing signal is received, an inverted bit stream of a frame-synchronizing-signal portion is output from the BPSK demapper 33. When a frame-synchronizing signal is correctly received or a receiving environment is deteriorated and a frame-synchronizing signal is received with an error of 1 bit or 2 bits, the first comparing circuit 63 outputs a high-potential correlation-detecting signal SYNA3 showing a possibility of capturing a frame-synchronizing signal.

Figure 4:
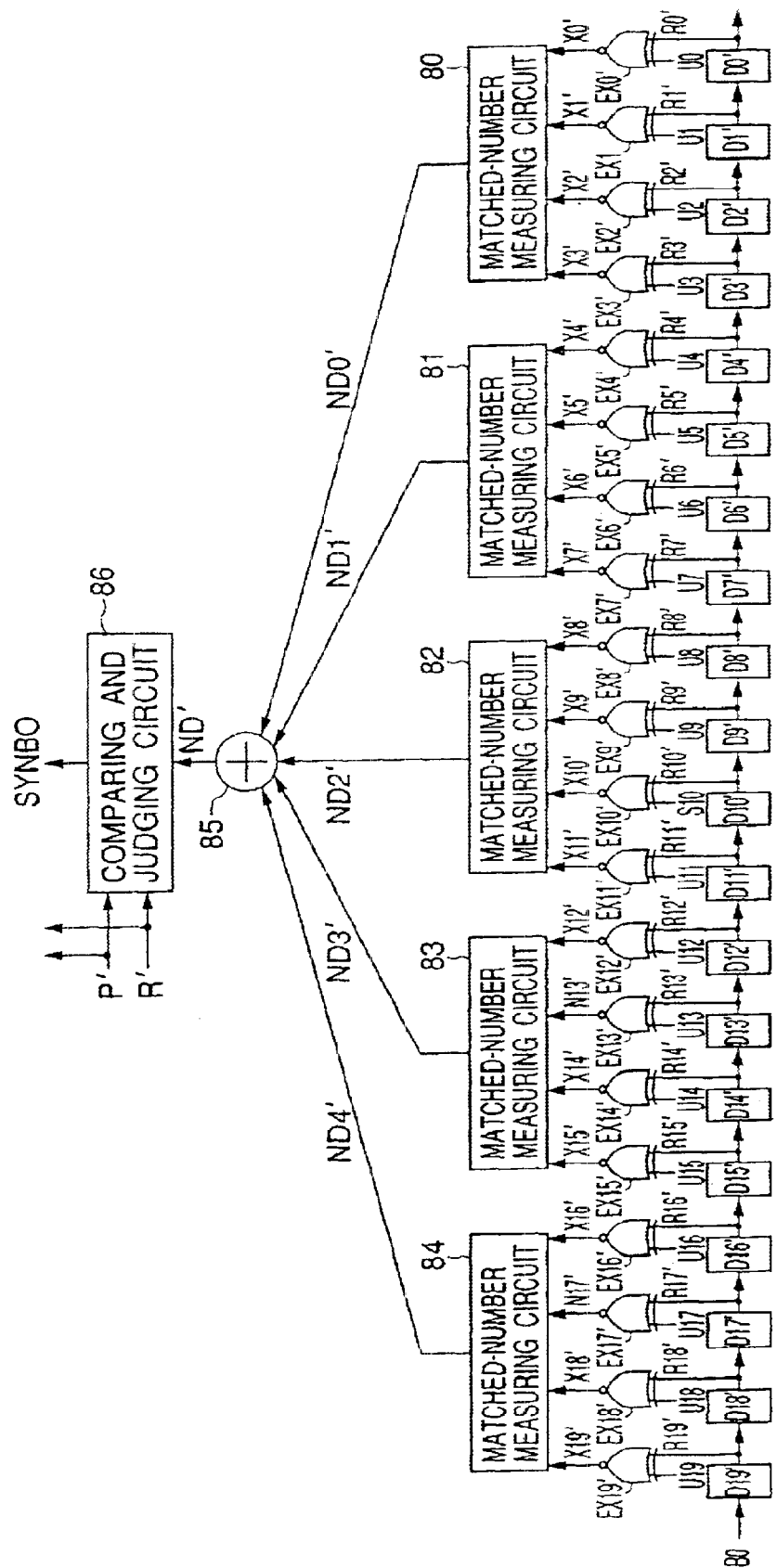
FIG. 4 is a block diagram showing a configuration of a second comparing circuit in FIG. 1.

The second comparing circuits 64 to 67 have the same configuration. FIG. 4 shows a configuration of the second comparing circuit 64. The second comparing circuit 64 has 20 D-flip-flops (hereafter referred to as D-F/Fs) D19' to D0' connected in series. A 20-stage shift register is constituted of these D-F/Fs D19' to D0'. A bit stream B0 is input to the D-F/F D19' and successively shifted up until the D-F/F D0'. Data R19' to R0' held by (stored in) the D-F/Fs D19' to D0' are input to one input terminals of EX-NOR circuits EX19' to EX0' individually set. Bit data U19 to U0 constituting a bit stream pattern W2 of a superframe-identifying signal are input to the other input terminals of the EX-NOR circuits EX19' to EX0'.

Outputs X0' to X19' of the EX-NOR circuits EX0' to EX19' become (1) when two inputs are matched and become (0) when two inputs are not matched. Five matched-number measuring circuits 80 to 84 are provided for output sides of the EX-NOR circuits EX0' to EX19' so that one matched-number measuring circuit is connected to every four EX-NOR circuits. The matched-number measuring circuits 80 to 84 measure the input number of (1)s and output measured matched-number data ND0' to ND4'. For example, the matched-number measuring circuit 80 outputs ND0' having the same relation as ND0 in FIG. 3 in accordance with the states of X0 to X3 input from the EX-NOR circuits EX0' to EX3'. The same is true for other matched-number measuring circuits 81 to 84. It is possible to simply constitute these matched-number measuring circuits 80 to 84 in small size in accordance with table conversion by a ROM or a combinational logic circuit.

Outputs ND0' to ND4' of the matched-number measuring circuits 80 to 84 are added by an adder 85 and an added value is input to a comparing and judging circuit 86 as ND'. The comparing and judging circuit 86 outputs a high-potential correlation-detecting signal SYNB0 when ND'≧P' or ND'≦R' is effective for predetermined first specified value P' and predetermined second specified value R'. In this case, it is assumed that P' is set to 18 and R' is set to 2.

Then, operations of the BPSK demapper 30 and second comparing circuit 64 are described below. When a received-signal-phase rotation angle θ is equal to 0 and the portion of a BPSK-modulated superframe-identifying signal W2 is correctly received, a bit stream B0 which is the portion of the superframe-identifying signal W2 and in which (0) or (1) is not inverted is output from the BPSK demapper 30. In this case, when the portion of the superframe-identifying signal W2 is just held by the D-F/F D0' to D19' constituting a shift register of the second comparing circuit 64 and output states (R0'R1' . . . R18'R19') become (00001011011001110111), outputs ND0' to ND5' of the matched-number measuring circuits 80 to 84 become 4 and an output ND' of the adder 85 becomes 20. In this case, the comparing and judging circuit 86 shows ND'≧P' (this represents only a difference of (20-P") bits from the pattern of W2). Therefore, the circuit 86 outputs a S high-potential correlation-detecting signal SYNB0 (the high-potential correlation-detecting signal SYNB0 shows a possibility of capturing a superframe-identifying signal W2 or W3).

Moreover, when a received-signal-phase rotation angle θ is equal to 0 and the portion of a BPSK-modulated superframe-identifying signal W3 is correctly received, a bit stream B0 in which the portion of the superframe-identifying signal W3 is not inverted is output from the BPSK demapper 30. In this case, when the portion of the superframe-identifying signal W3 is just held by the D-F/F D0' to D19' constituting a shift register and output states (R0'R1' . . . R18'R19') become (11110100100110001000), outputs ND0' to ND5' of the matched-number measuring circuits 80 to 84 become 0 and an output ND' of the adder 85 becomes 0. In this case, because the comparing and judging circuit 86 shows ND'≦R' (this represents a difference of only R' bits from the pattern of W3), the circuit 86 outputs a high-potential correlation-detecting signal SYNB0 showing a possibility of capturing the superframe-identifying signal W2 or W3.

When a received-signal-phase rotation angle θ is equal to 0 and a receiving environment is deteriorated, an error of 1 bit or 2 bits occurs in the bit stream B0 at the portion of the superframe-identifying signal W2 output from the BPSK demapper 30. In this case, when the portion of the superframe-identifying signal W2 is just held by the D-F/F D0' to D19', an output ND' of the adder 85 is equal to 18 to 19 and the comparing and judging circuit 86 shows ND'≧P'. Therefore, the circuit 86 outputs a high-potential correlation-detecting signal SYNB0 showing a possibility of capturing the superframe-identifying signal W2 or W3.

Moreover, when a received-signal-phase rotation angle θ is equal to 0 and a receiving environment is deteriorated, an error of 1 bit or 2 bits occurs in the bit stream B0 at the portion of the superframe-identifying signal W3 transmitted from the BPSK demapper 30. In this case, when the portion of the superframe-identifying signal W3 is just held by the D-F/F D0' to D19', an output ND' of the adder 85 is equal to 1 to 2 and the comparing and judging circuit 86 shows ND'≦R'. Therefore, the circuit 86 outputs a high-potential correlation-detecting signal SYNB0 showing a possibility of capturing the superframe-identifying signal W2 or W3.

When a received-signal-phase rotation angle θ is equal to π and the portion of the BPSK-modulated superframe-identifying signal W2 is correctly received, a bit stream B0 which is the portion of the superframe-identifying signal W2 and in which (0) and (1) are inverted is transmitted from the BPSK demapper 30. In this case, when the inverted portion of the superframe-identifying signal W2 is just held by the D-F/F D0' to D19' constituting a shift register and output states (R0'R1' . . . R18'R19') become (11110100100110001000) obtained by inverting bits of the superframe-identifying signal W2, outputs ND0' to ND5' of the matched-number measuring circuits 80 to 84 become 0 and an output ND' of the adder 85 becomes 0. In this case, because the comparing and judging circuit 86 shows ND'<R' ((20-R') bits are matched with W2 unless inverted), the circuit 86 outputs a high-potential correlation-detecting signal SYNB0 showing a possibility of capturing the superframe-identifying signal W2 or W3.

Moreover, when a received-signal-phase rotation angle θ is equal to π and the portion of the BPSK-modulated superframe-identifying signal W3 is correctly received, a bit stream B0 which is the portion of the superframe-identifying signal W3 and in which (0) and (1) are inverted is transmitted from the BPSK demapper 30. In this case, when the inverted portion of the superframe-identifying signal W3 is just held by the D-F/F D0' to D19' constituting a shift register and output states (R0'R1' . . . R18'R19') become (00001011011001110111) obtained by inverting bits of the superframe-identifying signal W3, outputs ND0' to ND5' of the matched-number measuring circuits 80 to 84 become 4 and an output ND' of the adder 85 becomes 20. In this case, because the comparing and judging circuit 86 shows ND'≧P' (having only a difference of (20-P') bits from W3 unless inverted), the circuit 86 outputs a high-potential correlation-detecting signal SYNB0 showing a possibility of capturing the superframe-identifying signal W2 or W3.

When a received-signal-phase rotation angle θ is equal to π and a receiving environment is deteriorated, an error of 1 bit or 2 bits occurs in the bit stream B0 in which the portion of the superframe-identifying signal W2 transmitted from the BPSK demapper 30 is inverted. In this case, when the inverted pattern of the portion of the superframe-identifying signal W2 is just held by the D-F/F D0' to D19', an output ND' of the adder 85 becomes 1 or 2 and the comparing and judging circuit 86 shows ND'≦R'.

Therefore, the circuit 86 outputs a high-potential correlation-detecting signal SYNB0 showing a possibility of capturing the superframe-identifying signal W2 or W3.

Moreover, when a received-signal-phase rotation angle θ is equal to π and a receiving environment is deteriorated, an error of 1 bit or 2 bits occurs in the bit stream B0 in which the portion of the superframe-identifying signal W3 transmitted from the BPSK demapper 30 is inverted. In this case, when the inverted pattern of the portion of the superframe-identifying signal W3 is just held by the D-F/F D0' to D19', an output ND' of the adder 85 becomes 18 or 19 and the comparing and judging circuit 86 shows ND'≧P'. Therefore, the circuit 86 outputs a high-potential correlation-detecting signal SYNB0 showing a possibility of capturing the superframe-identifying signal W2 or W3.

The second comparing circuits 65 to 67 are constituted completely similarly to the second comparing circuit 64. When a received-signal-phase rotation angle θ is equal to π/4 or 5π/4 and the superframe-identifying signal W2 or W3 is correctly received or received with an error of 1 bit or 2 bits, the second comparing circuit 65 outputs a high-potential frame-synchronizing signal SYNB1 showing a possibility of capturing the superframe-identifying signal W2 or W3. When a received-signal-phase rotation angle θ is equal to 2π/4 or 6π/4 and the superframe-identifying signal W2 or W3 is correctly received or received with an error of 1 bit or 2 bits, the second comparing circuit 66 outputs a high-potential correlation-detecting signal SYNB2 showing a possibility of capturing the superframe-identifying signal W2 or W3. Moreover, when a received-signal-phase rotation angle θ is equal to 3π/4 or 7π/4 and the superframe-identifying signal W2 or W3 is correctly received or received with an error of 1 bit or 2 bits, the second comparing circuit 67 outputs a high-potential correlation-detecting signal SYNB3 showing a possibility of capturing the superframe-identifying signal W2 or W3.

A frame-synchronizing-signal-capturing-signal generating circuit 90 is provided for output sides of the first comparing circuits 60 to 63 and the second comparing circuits 64 to 67. The frame-synchronizing-signal capturing-signal generating circuit 90 has a function for outputting a frame-synchronizing-signal capturing signal when a correlation-detection output from one of the first comparing circuits 60 to 63 and a correlation-detection output from one of the second comparing circuits 64 to 67 occur in accordance with a predetermined temporal relation. In the frame-synchronizing-signal-capturing-signal generating circuit 90, symbol 91 denotes an OR gate circuit for obtaining the logical sum of outputs SYNA0 to SYNA3 of the first comparing circuits 60 to 63, 92 denotes an OR gate circuit for obtaining the logical sum of outputs SYNB0 to SYNB3 of the second comparing circuits 64 to 67, 93 denotes a delay circuit for delaying an output of the OR gate circuit 91 by a time (corresponding to 160 symbols) from the end of a frame-synchronizing signal up to the end of a superframe-identifying signal, and 94 denotes an AND circuit for obtaining the logical product of outputs of the delay circuit 93 and the OR gate circuit 92.

Not only when a frame-synchronizing signal is correctly received under a preferable receiving environment but also when a frame-synchronizing signal is received with an error of 1 bit or 2 bits under the worst receiving environment, a high-potential correlation-detecting signal showing a possibility of receiving a frame-synchronizing signal is output from one of the first comparing circuits 60 to 63 even if a received-signal-phase rotation angle θ is equal to (π/4)×n (n is any one of integers 0 to 7). Moreover, when a high potential is output from one of the first 1 comparing circuits 60 to 63, there is a possibility that a similar pattern having only a difference of 1 bit or 2 bits from a frame-synchronizing signal is received.

Moreover, not only when the superframe-identifying signal W2 or W3 is correctly received under a preferable receiving environment but also with an error of 1 bit or 2 bits is received under the worst receiving environment, a high-potential correlation-detecting signal showing a possibility that the superframe-identifying signal W2 or W3 is received from one of the second comparing circuits 64 to 67 is output even if a received-signal-phase rotation angle θ is equal to (π/4)×n (n is any one of integers 0 to 7).

When a frame-synchronizing signal is received, a high-potential correlation-detecting signal output from one of the first comparing circuits 60 to 63 is input to the delay circuit 93 through the OR circuit 91, delayed by a time corresponding to 160 symbols, and then input to the AND circuit 94. Therefore, when the superframe-identifying signal W2 or W3 is received, the timing of the high-potential correlation-detecting signal coincides with that of a high-potential correlation-detecting signal output from one of the second comparing circuits 64 to 67 and input to the AND circuit 94 through the OR circuit 92 and thereby, a high potential is output from the AND circuit 94. Inversely saying, when an output of the AND circuit 94 becomes a high potential, a pattern having a difference of one bit to several bits at most from a pattern of a frame-synchronizing signal appears in I and Q symbol streams and then, a pattern having a difference of one bit to several bits at most from the pattern of the superframe-identifying signal W2 or W3 appears in I and Q symbol streams after a time corresponding to 160 symbols.

In the case of the hierarchical transmission system, a frame-synchronizing signal and a superframe-identifying signal are arranged in one frame in accordance with a predetermined positional relation (160 symbols from the end of the frame-synchronizing signal up to the end of the superframe-identifying signal) (refer to FIG. 7). When a pattern having a difference of one bit to several bits at most from a pattern of a frame-synchronizing signal and a pattern having a difference of one bit to several bits at most from a pattern of a superframe-identifying signal consecutively appear in demodulated I and Q symbol-stream data in accordance with a predetermined time relation specified by a frame format, the pattern having a difference of one bit to several bits at most from the pattern of the frame-synchronizing signal has a high possibility that the former pattern is a frame-synchronizing signal. Therefore, by outputting a high potential of the AND circuit 94 as a frame-synchronizing-signal capturing signal, it is possible to capture a frame-synchronizing signal from I and Q symbol streams at a certain delay time.

An output SYN of the frame-synchronizing-signal-capturing-signal generating circuit 90 is input to the frame-synchronizing circuit 5.

The frame-synchronizing circuit 5 discriminates that frame sync is established when it is confirmed that a frame-synchronizing signal SYN repeatedly becomes a high potential every certain frame cycle and outputs a frame-synchronizing pulse FSYNC every frame cycle. The frame-synchronizing pulse FSYNC has a certain time relation with a frame-synchronizing signal in received I and Q symbol streams. Whenever receiving the frame-synchronizing pulse FSYNC from the frame-synchronizing circuit 5, the frame-synchronizing signal generator 6 generates a bit stream (this is referred to as regenerated frame-synchronizing signal) same as a pattern W1 of a frame-synchronizing signal captured from I and Q symbol streams by the BPSK demapper section 3A, first comparing circuits 60 to 63, second comparing circuits 64 to 67, and frame-synchronizing-signal-capturing-signal generating circuit 90.

This embodiment is constituted so as to generate a frame-synchronizing-signal capturing signal when a received pattern having a difference of 1 bit or 2 bits at most from a frame-synchronizing signal is detected and a received pattern having a difference of 1 bit or 2 bits from a superframe-identifying signal is detected and these two types of detection occur in accordance with a predetermined time relation specified by a frame format. Therefore, even if a receiving environment is greatly deteriorated, it is possible to stably and quickly capture a frame-synchronizing signal from I and Q symbol streams after a certain time and thus, reception is not disabled. Moreover, when constituting this embodiment with a ROM, it is enough to use four BSPK demappers respectively requiring a large capacity. Therefore, it is possible to reduce a circuit size.

In the case of the above embodiment, P and P' are respectively set to 18, and R and R' are respectively set to 2 correspondingly to the fact that a frame-synchronizing signal and a superframe-identifying signal respectively have a bit length of 20 bits. However, this is only an example, and it is also permitted to set P and P' to other value such as 17, and R and R' to other value such as 3. In general, because an error rate is approx. $10^{-1}$ under the worst receiving environment such as 0 dB, it is preferable to set (FL-P) to R, and R to approx. FL/10 when assuming a bit length of a frame-synchronizing signal as FL. For example, when FL is equal to 20 bits, it is preferable to set R to 1 to 4 and more preferable to set R to 2 or 3. Moreover, when assuming a bit length of a superframe-identifying signal as SFL, it is preferable to set (SFL-P') to R', and R' to approx. SFL/10. For example, when SFL is equal to 20 bits, it is preferable to set R' to 1 to 4 and more preferable to set R' to 2 or 3.

Furthermore, it is also permitted to omit the delay circuit 93 and set another delay circuit for delaying data by a time (corresponding to 39776 symbols) from the end of a superframe-identifying signal up to the end of the next frame-identifying signal between the OR gate circuit 92 and the AND circuit 94.

Furthermore, by inputting the bits obtained by inverting the frame-synchronizing-signal pattern Wi to one input terminals of the EX-NOR circuits EX0 to EX19 in FIG. 2 about any one of the first comparing circuits 60 to 63 instead of inputting the bits S0 to S19 of the frame-synchronizing signal pattern Wi to the above input terminals, it is possible to capture a pattern having a difference of several bits at most from a frame-synchronizing signal.

For example, in the case of the first comparing circuit 60, when a received-signal-phase rotation angle θ is equal to 0 and thereby, the portion of the BPSK-modulated frame-synchronizing signal Wi is received with an error of 2 bits or less and the frame-synchronizing-signal portion is just held by the D-F/F D0 to D19 constituting a shift register of the first comparing circuit 60, an output DN of the adder 75 becomes 0 to 2. In this case, because the comparing and judging circuit 76 shows ND<R and this is matched with a bit pattern W1 of a frame-synchronizing signal in (20-R) bits or more. Therefore, the circuit 76 outputs a high-potential correlation-detecting signal SYNA0 showing a possibility of capturing a frame-synchronizing signal.

However, when a received-signal-phase rotation angle θ is equal to π and thereby, the portion of the BPSK-modulated frame-synchronizing signal Wi is received with an error of 2 bits or less and the frame-synchronizing signal portion is just held by the D-F/F D0 to D19 constituting a shift register of the first comparing circuit 60, an output ND of the adder 75 becomes 18 to 20. In this case, because the comparing and judging circuit 76 shows ND≧P and this has a difference of only (20-P) bits or less from the bit pattern W1 of a frame-synchronizing signal. Therefore, the circuit 76 outputs a high-potential correlation-detecting signal SYNA0 showing a possibility of capturing a frame-synchronizing signal.

The same is true for other first comparing circuits 61 to 63.

Moreover, by inputting the bits V0 to V19 of W3 obtained by inverting W2 to one input terminals of the EX-NOR circuits EX0' to EX19' in FIG. 4 about any one of the second comparing circuits 64 to 67 instead of inputting the bits U0 to U19 of the superframe-identifying-signal pattern W2 to the above one input terminals, it is possible to capture a pattern having a difference of several bits at most from the superframe-identifying signal W2 or W3.

For example, in the case of the second comparing circuit 64, when a received-signal-phase rotation angle θ is equal to 0, the portion of the BPSK-modulated superframe-identifying signal W2 is received with an error of 2 bits or less, and the portion of the superframe-identifying signal W2 is just held by the D-F/F D0' to D 19' constituting a shift register of the second comparing circuit 64, an output ND' of the adder 85 becomes 0 to 2. In this case, the comparing and judging circuit 86 shows ND'≦R' and this is matched with the bit pattern of the superframe-identifying signal W2 in (20-R') bits or more, the circuit 86 outputs a high-potential correlation-detecting signal SYNB0 showing a possibility of capturing W2 or W3.

Moreover, when a received-signal-phase rotation angle θ is equal to 0, the portion of the BPSK-modulated superframe-identifying signal W3 is received with an error of 2 bits or less, and the portion of the superframe-identifying signal W3 is just held by the D-F/F D0' to D19' constituting a shift register of the second comparing circuit 64, an output ND' of the adder 85 becomes 18 to 20. In this case, the comparing and judging circuit 86 shows ND'≧P' and this has only a difference of (20-P') bits or less from the bit pattern of the superframe-identifying signal W3, the circuit 86 outputs a high-potential correlation-detecting signal SYNB0 showing a possibility of capturing W2 or W3.

Moreover, when a received-signal-phase rotation angle θ is equal to π, the portion of the BPSK-modulated superframe-identifying signal W2 is received with an error of 2 bits or less, and the portion of the superframe-identifying signal W2 is just held by the D-F/F D0' to D19' constituting a shift register of the second comparing circuit 64, an output ND' of the adder 85 becomes 18 to 20. In this case, the comparing and judging circuit 86 shows ND'≧P' and this has a difference of only (20-P') bits from the bit pattern of the superframe-identifying signal W2, the circuit 86 outputs a high-potential correlation-detecting signal SYNB0 showing a possibility of capturing W2 or W3.

Moreover, when a received-signal-phase rotation angle θ is equal to π, the portion of the BPSK-modulated superframe-identifying signal W3 is received with an error of 2 bits or less, and the portion of the superframe-identifying signal W2 is just held by the D-F/F D0' to D 19' constituting a shift register of the second comparing circuit 64, an output ND' of the adder 85 becomes 0 to 2. In this case, the comparing and judging circuit 86 shows ND'≦R' and this is matched with the bit pattern of the superframe-identifying signal W3 in (20-R') bits or more, the circuit 86 outputs a high-potential correlation-detecting signal SYNB0 showing a possibility of capturing W2 or W3.

The same is true for other second comparing circuits 65 to 67.

Figure 5:
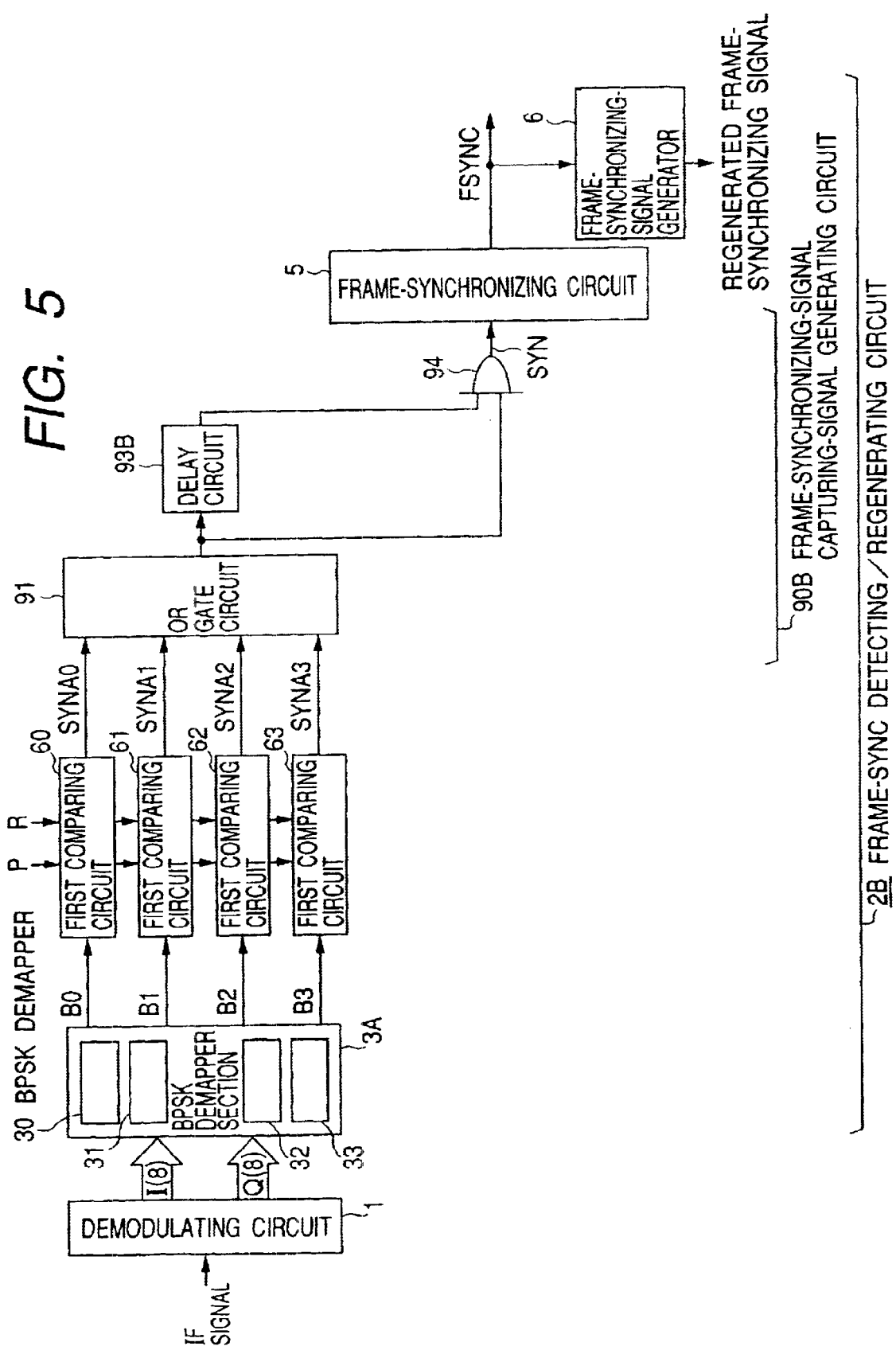
FIG. 5 is a block diagram showing an essential portion of the wave-to-be-PSK-modulated receiver of a modification of the embodiment in FIG. 1.
Figure 9A:
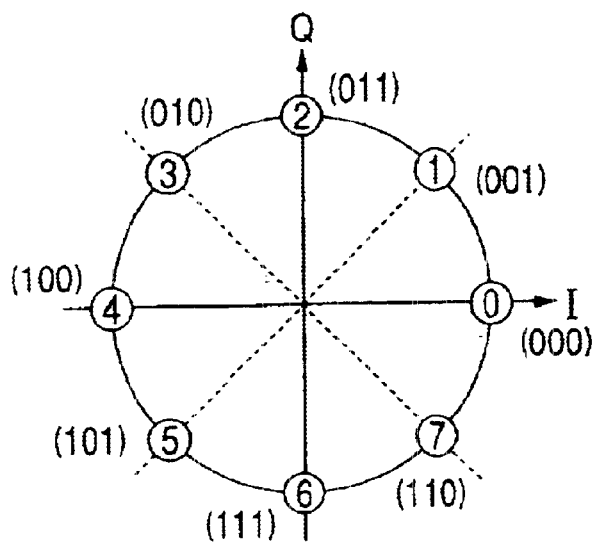
FIGS. 9A to 9C are prior art illustrations showing signal point arrangement of r PSK mapping.
Figure 9B:
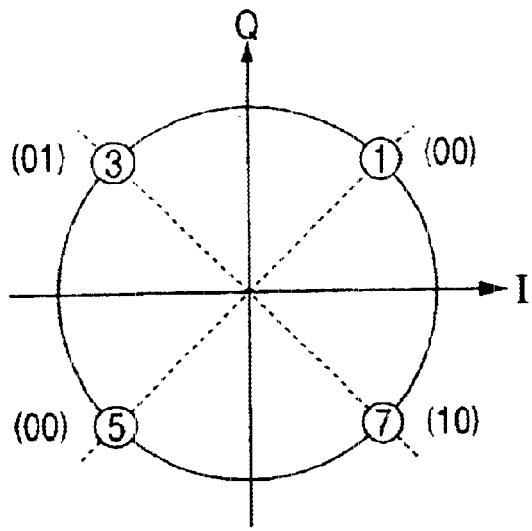
Figure 9C:
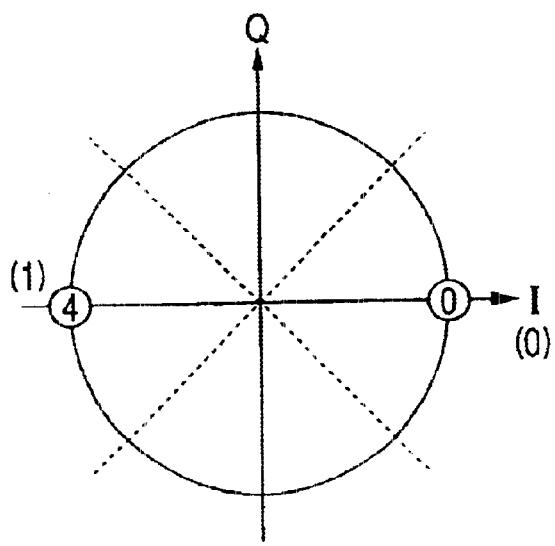

Furthermore, as shown by the frame-sync detecting/regenerating circuit 2B in FIG. 5, it is also permitted to omit the second comparing circuits 64 to 67 in FIG. 1, supply an output of the OR gate circuit 91 to a delay circuit 93B and the AND circuit 94, and supply an output of the delay circuit 93B to the AND circuit 94 from a frame-synchronizing-signal-capturing-signal generating circuit 90B, and delay the outputs by integral multiples of a frame cycle, preferably by one frame cycle or two frame cycles in the delay circuit 93B.

In the case of the hierarchical transmission system, frame-synchronizing signals are arranged at predetermined positions in one frame (refer to FIG. 7). When a pattern having a difference of one bit to several bits at most from a pattern of a frame-synchronizing signal appears in demodulated I and Q symbol-stream data and then, the pattern appears again after integral multiples of a frame cycle, the pattern having a difference of one bit to several bits at most from the pattern of the frame-synchronizing signal has a very high possibility that the pattern is a frame-synchronizing signal. Therefore, by outputting a high potential of the AND circuit 94 as a frame-synchronizing-signal capturing signal SYN, it is possible to stably capture frame-synchronizing signals from I and Q symbol streams.

According to the example in FIG. 5, it is possible to greatly decrease a circuit size by omitting the second comparing circuits 64 to 67.

However, as shown by the frame-sync detecting/regenerating circuit 2C in FIG. 6, it is also permitted to omit the first comparing circuits 60 to 63, supply an output of the OR circuit 92 to a delay circuit 93C and the AND circuit 94, and supply an output of the delay circuit 93C to the AND circuit 94 from a frame-synchronizing-signal-capturing-signal generating circuit 90C, and delay the outputs by integral multiples of a frame cycle, preferably by one frame cycle or two frame cycles in the delay circuit 93C.

In the case of the hierarchical transmission system, a frame-synchronizing signal Wi and superframe-identifying signals W2 and W3 are arranged in one frame in accordance with a predetermined positional relation (refer to FIG. 7). When a pattern having a difference of one bit to several bits at most from the pattern of the superframe-identifying signal W2 or W3 appears in demodulated I and Q symbol-stream data and then, the pattern appears again after integral multiples of a frame cycle, the pattern having a difference of one bit to several bits at most from the superframe-identifying signal W2 or W3 has a very high possibility that the pattern is the superframe-identifying signal W2 or W3 and a possibility that a frame-synchronizing signal appears a certain time before the superframe-identifying signal W2 or W3 appears is very high. Therefore, it is possible to stably capture frame-synchronizing signals from I and Q symbol streams at a certain delay time by outputting a high potential of the AND circuit 94 as a temporary frame-synchronizing-signal capturing signal SYN'.

Also in the case of the example in FIG. 6, it is possible to greatly decrease a circuit size by omitting the first comparing circuits 60 to 63.

The embodiment in FIG. 1 is described by assuming that the superframe-identifying signal W3 of a frame other than the head of a superframe matches with a bit inverted pattern of the superframe-identifying signal W2 of the head frame of the superframe. However, if the superframe-identifying signal W3 of a frame other than the head of a superframe is different from the bit inverted pattern of the superframe-identifying signal W2 of the head frame of the superframe, none of the second comparing circuits 64 to 67 capture the portion of the superframe-identifying signal W3 even if it is received.

However, when the portion of the superframe-identifying signal W2 is received, it is captured by any one of the second comparing circuits 64 to 67 and a high potential is output from the OR gate circuit 92. Therefore, when a frame-synchronizing signal is captured by any one of the first comparing circuits 60 to 63 previously by a 160-symbol period, a high-potential frame-synchronizing-signal capturing signal SYN is output from the AND circuit 94. In this case, it is preferable to make the frame-synchronizing circuit 5 output a frame-synchronizing pulse FSYNC at a frame cycle by assuming that frame sync is established when a high-potential frame-synchronizing-signal capturing signal SYN is repeatedly input from the AND circuit 94 at a superframe cycle.

Also, the modification in FIG. 6 is described by assuming that the superframe-identifying signal W3 of a frame other than the head of a superframe matches with a bit inverted pattern of the superframe-identifying signal W2 of the head frame of the superframe. However, if the superframe-identifying signal W3 of the frame other than the head of the superframe is different from the bit inverted pattern of the superframe-identifying signal W2 of the head frame of the superframe, none of the second comparing circuits 64 to 67 capture the portion of the superframe-identifying signal W3 even if it is received. However, when the portion of the superframe-identifying signal W3 is received, it is captured by any one of the second comparing circuits 64 to 67 and a high potential is output from the OR gate circuit 92.

By setting a delay time of the delay circuit 93C to integral multiples of a superframe cycle, when the portion of the superframe-identifying signal W2 is received and a high potential is output from the OR gate circuit 92 and the superframe-identifying signal W2 is captured by any one of the second comparing circuits 64 to 67 previously by the delay time of the delay circuit 93C, a high-potential frame-synchronizing-signal capturing signal SYN' is output from the AND circuit 94. In this case, it is preferable to make the frame-synchronizing circuit 5 output a frame-synchronizing pulse FSYNC at a frame cycle by assuming that frame sync is established when a high-potential frame-synchronizing-signal capturing signal SYN' is repeatedly input from the AND circuit 94 at a superframe cycle.

For BPSK mapping, a case is described in which bit (0) is mapped to a signal point arrangement "0" and bit (1) is mapped to a signal point arrangement "4". However, the present invention is not restricted to the above case. It is also possible to apply the present invention to a case of mapping bit (0) to a signal point arrangement "4" and bit (1) to a signal point arrangement "0." In this case, it is preferable to replace (0) and (1) judgment areas each other for BPSK demapping in FIGS. 12 and 13.

Industrial Applicability

According to the present invention, a received pattern having a difference of several bits at most from a frame-synchronizing signal is detected and moreover, a received pattern having a difference of several bits at most from a superframe-identifying signal is detected so as to generate a frame-synchronizing-signal capturing signal when these two types of detection occur in accordance with a predetermined time relation specified by a frame format. Therefore, it is possible to stably capture a frame-synchronizing signal from a received symbol stream even if a receiving environment is greatly deteriorated.

What is claimed is:

1. A frame-synchronizing-signal capturing circuit of a receiver for capturing a frame-synchronizing signal from I and Q symbol-stream data (I(8) and Q(8)) obtained by receiving and demodulating a signal to be PSK-modulated in which a BPSK-modulated frame-synchronizing signal and a superframe-identifying signal, an 8PSK-modulated digital signal, a QPSK-modulated digital signal, and a BPSK-modulated digital signal are time-multiplexed, characterized by, BPSK demapping means (3A) for independently BPSK-demapping I and Q symbol-stream data in accordance with four criterion border lines obtained by rotating a criterion border line for performing BPSK-demapping to bits (0) and (1) (or (1) and (0)) depending on the fact that a received-signal point according to I and Q symbol-stream data is present at right side or left side of Q-axis on I-Q phase plane by $(\pi/4) \times m$ where (m denotes four integers selected out of integers 0 to 7 so that the four integers are not duplicated and a selected angle does not coincide with others even if it is rotated by n) and outputting bit streams of four systems;

first comparing means (60 to 63) provided for each system of outputs of the BPSK demapping means to compare a data pattern held by a shift register with a frame-synchronizing-signal pattern or an inverted-frame-synchronizing-signal pattern while inputting a bit stream to the shift register and perform correlation-detection output when there are matched numbers in bit unit equal to or more than a predetermined first specified value P and there are only matched numbers equal to or less than a predetermined second specified value R;

second comparing means (64 to 67) provided for each system output from the BPSK demapping means to compare a data pattern held by a shift register with a superframe-identifying-signal pattern or an inverted-superframe-identifying-signal pattern while inputting a bit stream to the shift register and perform correlation-detection output when there are matched numbers in bit unit equal to or more than a predetermined third specified value P' and there are only matched numbers in bit unit equal to or less than a predetermined fourth specified value R'; and frame-synchronizing-signal-capturing-signal generating means (90) for outputting a frame-synchronizing-signal capturing signal (SYN) when a correlation-detection output supplied from one of the first comparing means and a correlation-detection output supplied from one of the second comparing means are generated in accordance with a predetermined time relation.

2. A frame-synchronizing-signal capturing circuit of a receiver for capturing a frame-synchronizing signal from I and Q symbol-stream data obtained by receiving and demodulating a signal to be PSK-modulated in which a BPSK-modulated frame-synchronizing signal, an 8PSK-modulated digital signal, a QPSK-modulated digital signal, and a BPSK-modulated digital signal are time-multiplexed, characterized by:

BPSK demapping means (3A) for independently BPSK-demapping I and Q symbol-stream data in accordance with four criterion border lines obtained by rotating a criterion border line for performing BPSK-demapping to bits (0) and (1) (or (1) and (0)) depending on the fact that a received-signal point according to I and Q symbol-stream data is present at right side or left side of Q-axis on I-Q phase plane by $(n\pi/4) \times m$ where (m denotes four integers selected out of integers 0 to 7 so that the four integers are not duplicated and a selected angle does not coincide with others even if it is rotated by $\pi$) and outputting bit streams of four systems;

comparing means (60 to 63) provided for each system of outputs of the BPSK demapping means to compare a data pattern held by a shift register with a frame-synchronizing-signal pattern of an inverted-frame-synchronizing-signal pattern while inputting a bit stream to the shift register and perform correlation-detection output when there are matched numbers in bit unit equal to or more than a predetermined first specified value P and there are only matched numbers equal to or less than a predetermined second specified value R; and frame-synchronizing-signal-capturing-signal generating means (90B) for outputting a frame-synchronizingsignal capturing signal (SYN) when a correlation detection output is generated from one of the comparing means and thereafter, a correlation-detection output is generated again from one of the comparing means at a timing when elapsing by a predetermined time.

3. A frame-synchronizing-signal capturing circuit of a receiver for capturing a frame-synchronizing signal from I and Q symbol-stream data obtained by receiving and demodulating a signal to be PSK-modulated in which a BPSK-modulated frame-synchronizing signal and a superframe-identifying signal, an 8PSK-modulated digital signal, a QPSK-modulated digital signal, and a PSK-modulated digital signal are time-multiplexed, characterized by:

BPSK demapping means (3A) for independently BPSK-demapping I and Q symbol-stream data to output bit streams of four systems in accordance with four criterion border lines obtained by rotating a criterion border line for performing BPSK demapping to bits (0) and (1) (or (1) and (0)) depending on the fact that a received-signal point according to I and Q symbol-stream data is present at right side or left side of Q-axis on I-Q phase plane by $(\pi/4) \times m$ (m denotes four integers selected out of integers 0 to 7 so that the four integers are not duplicated and a selected angle does not coincide with others even if it is rotated by $\pi$);

comparing means (64 to 67) provided for each system of outputs of the BPSK demapping means to compare a data pattern held by a shift register with a superframe-identifying-signal pattern or an inverted-superframe-identifying-signal pattern while inputting a bit stream to the shift register and perform correlation-detection output when there are matched numbers in bit unit equal to or more than a predetermined specified value P' and there are only matched numbers equal to or less than a predetermined specified value R'; and frame-synchronizing-signal-capturing-signal generating means (90C) for outputting a temporary frame-synchronizing-signal capturing signal (SYN') when a correlation-detection output is generated from one of the comparing means and thereafter, a correlation-detection output is generated again from one of the comparing means at a timing when elapsing by a predetermined time.

* * * * *